(12) United States Patent
Sawai

(10) Patent No.: US 10,827,378 B2
(45) Date of Patent: Nov. 3, 2020

(54) COMMUNICATION CONTROL APPARATUS, COMMUNICATION CONTROL METHOD, RADIO COMMUNICATION APPARATUS, RADIO COMMUNICATION METHOD AND RADIO COMMUNICATION SYSTEM

(71) Applicant: SONY CORPORATION, Tokyo (JP)

(72) Inventor: Ryo Sawai, Tokyo (JP)

(73) Assignee: SONY CORPORATION, Tokyo (JP)

( * ) Notice: Subject to any disclaimer, the term of this patent is extended or adjusted under 35 U.S.C. 154(b) by 181 days.

(21) Appl. No.: 15/024,790

(22) PCT Filed: Jul. 24, 2014

(86) PCT No.: PCT/JP2014/069535
§ 371 (c)(1),
(2) Date: Mar. 24, 2016

(87) PCT Pub. No.: WO2015/052973
PCT Pub. Date: Apr. 16, 2015

(65) Prior Publication Data
US 2016/0219454 A1 Jul. 28, 2016

(30) Foreign Application Priority Data
Oct. 7, 2013 (JP) .................................. 2013-210045

(51) Int. Cl.
*H04W 28/02* (2009.01)
*H04W 52/02* (2009.01)
(Continued)

(52) U.S. Cl.
CPC ....... *H04W 28/0247* (2013.01); *H04W 16/32* (2013.01); *H04W 28/0268* (2013.01);
(Continued)

(58) Field of Classification Search
None
See application file for complete search history.

(56) References Cited

U.S. PATENT DOCUMENTS

| | | | |
|---|---|---|---|
| 2014/0254476 A1* | 9/2014 | Blankenship | H04L 47/20 370/328 |
| 2015/0043437 A1* | 2/2015 | Chakraborty | H04W 72/082 370/329 |

FOREIGN PATENT DOCUMENTS

| | | |
|---|---|---|
| JP | 2012-249106 A | 12/2012 |
| JP | 2013-509761 A | 3/2013 |

OTHER PUBLICATIONS

China Unicom, "Consideration on intra-LTE energy saving solutions for small cell" [online], 3GPP TSG-RAN WG3 Meeting #79, R3-130127, Jan. 28-Feb. 1, 2013, Internet <URL:http://www.3gpp.org/ftp/tsg_ran/WG3_lu/TSGR3_79/Docs/R3-130127.zip>, Jan. 18, 2013, "2.Discussion", 3 pages.

(Continued)

*Primary Examiner* — Peter Chen
*Assistant Examiner* — Jeff Banthrongsack
(74) *Attorney, Agent, or Firm* — Xsensus LLP

(57) ABSTRACT

[Object] Provided is a mechanism for enabling efficient signaling to control operation modes of small cells in an environment where a number of small cells are deployed.
[Solution] Provided is a communication control apparatus including: a communication unit configured to communicate with each of communication nodes operating a plurality of small cells, each of which belongs to at least one of a plurality of small cell groups; a determining unit configured to determine whether operation modes of the plurality of small cells should be set to be an active mode in units of the small cell groups; and a signaling unit configured to signal a control message for specifying the operation modes in (Continued)

units of the small cell groups, determined by the determining unit to the communication nodes via the communication unit.

21 Claims, 30 Drawing Sheets

(51) Int. Cl.
*H04W 16/32* (2009.01)
*H04W 84/04* (2009.01)
*H04W 88/12* (2009.01)

(52) U.S. Cl.
CPC ....... *H04W 52/02* (2013.01); *H04W 52/0206* (2013.01); *H04W 84/045* (2013.01); *H04W 88/12* (2013.01); *Y02D 70/1262* (2018.01); *Y02D 70/1264* (2018.01); *Y02D 70/164* (2018.01); *Y02D 70/166* (2018.01); *Y02D 70/21* (2018.01); *Y02D 70/23* (2018.01); *Y02D 70/24* (2018.01); *Y02D 70/25* (2018.01)

(56) References Cited

OTHER PUBLICATIONS

NEC Group, "Views on interference coordination for semi-static small cell on/off" [online], 3GPP TSG-RAN WG1 Meeting #74bis, Oct. 7-Oct. 11, 2013, R1-134247, Internet <URL:http://www.3gpp.org/ftp/tsg_ran/WG1_RL1/TSGR1_74b/Docs/R1-134247.zip>, Sep. 27, 2013, "2.Discussion", 5 pages.

NTT Docomo, "Text Proposal for TR36.923 on Small Cell Enhancement Scenarios", 3GPP TSG RAN WG1 Meeting #72, Jan. 28-Feb. 1, 2013, R1-130748, 5 pages.

LG Electronics, "Analysis and design consideration of cell on/off in small cell", 3GPP TSG RAN WG1 Meeting #73, May 20-May 24, 2013, R1-132236, 6 pages.

* cited by examiner

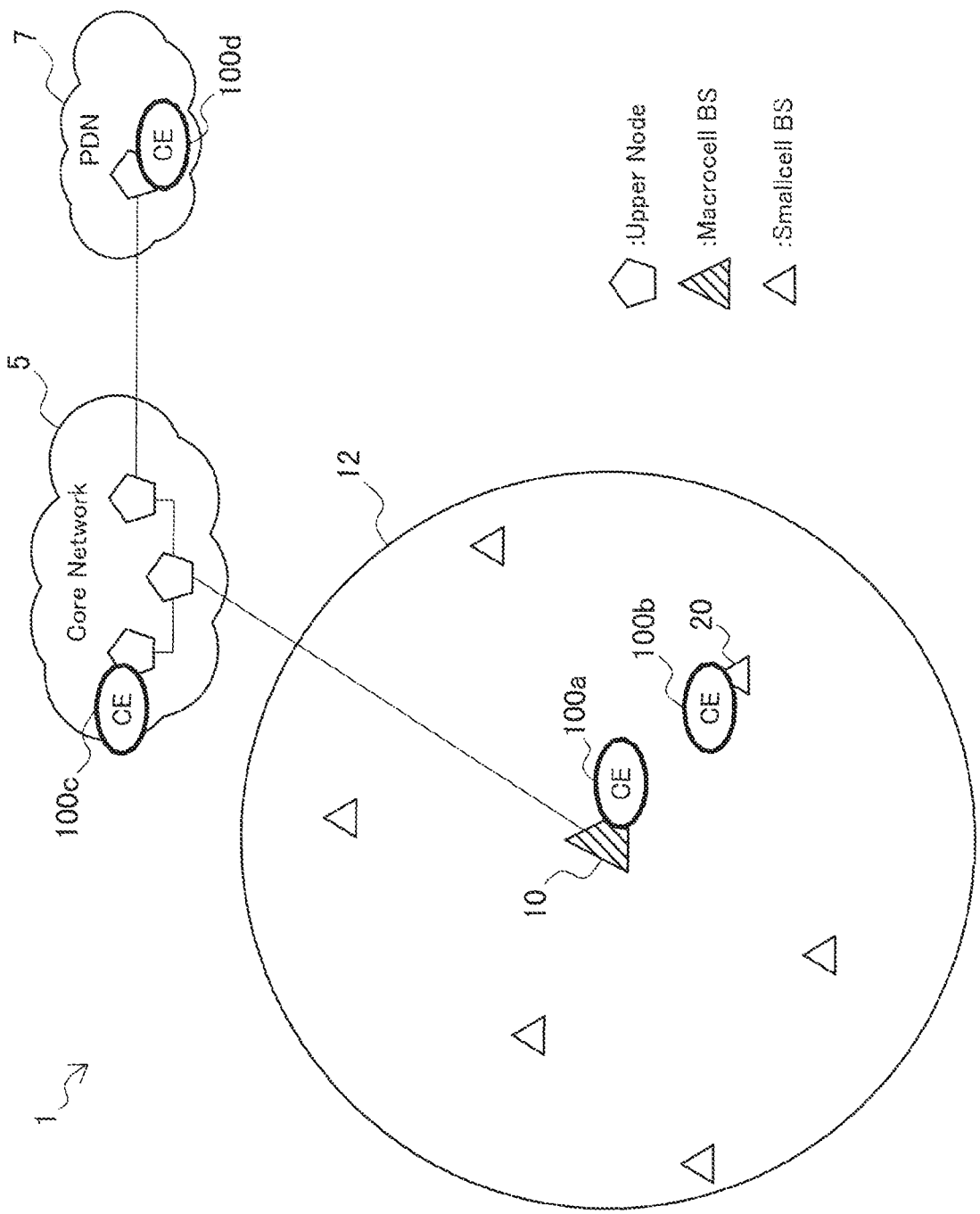

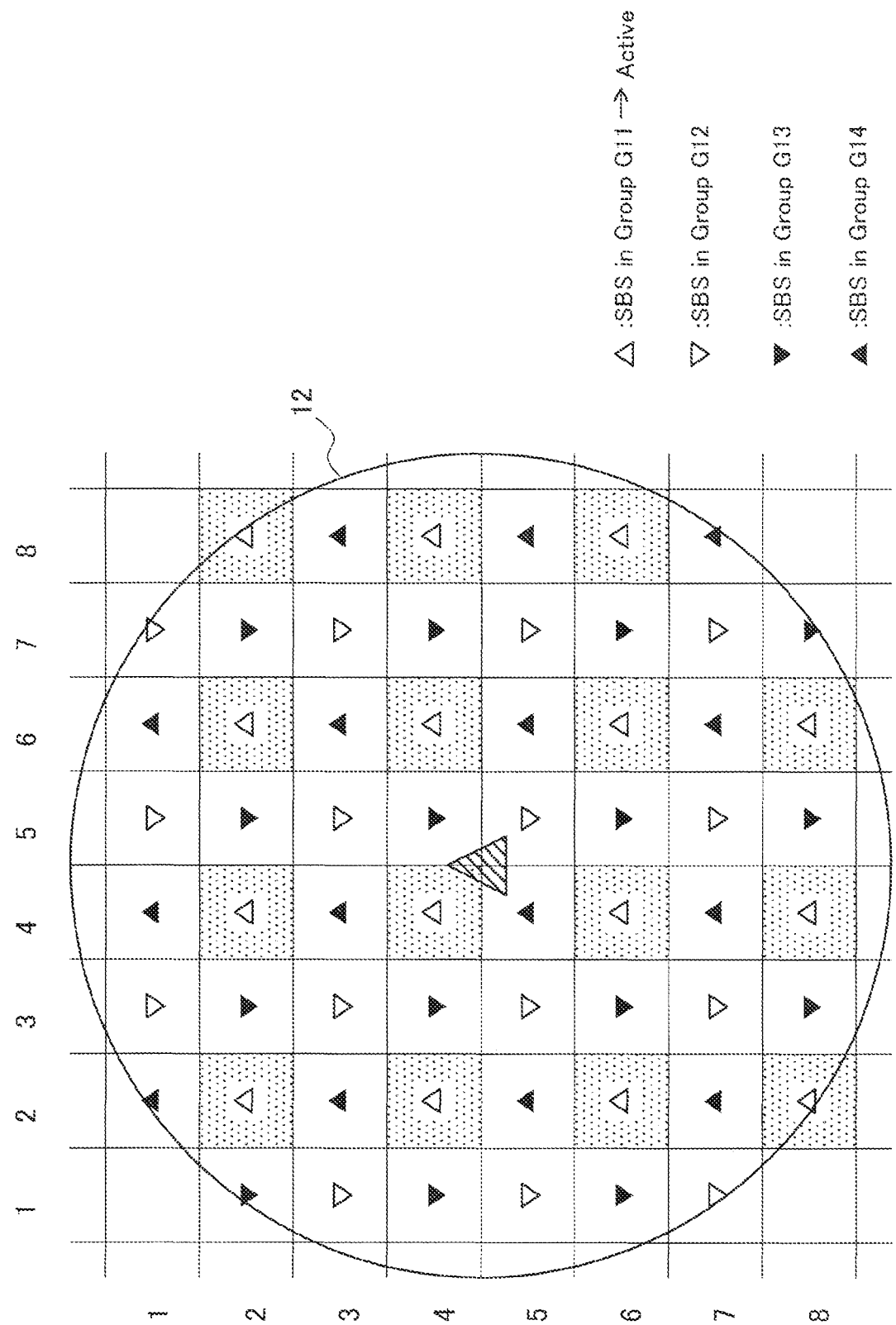

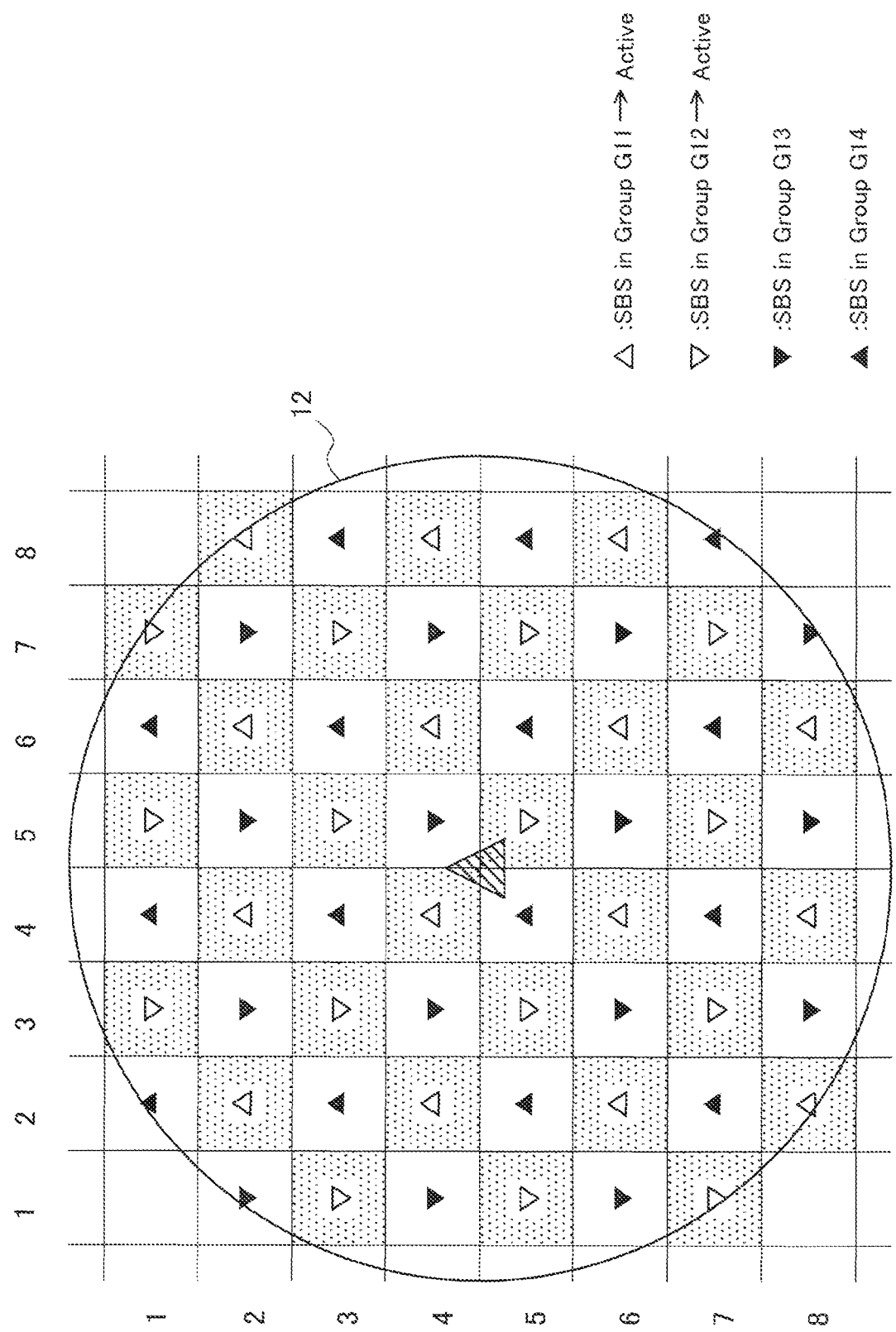

FIG. 12

| CELL ID (132) | CELL RADIUS (133) | BS LOCATION (134) | MAXIMUM NUMBER OF ACCOMMODATED TERMINALS (135) | BS TYPE (136) | AVAILABLE CHANNEL (137) | OPERATION CHANNEL (138) | NUMBER OF ACCOMMODATED TERMINALS (139) | BAND USE RATE (140) | GROUP ID (141) |
|---|---|---|---|---|---|---|---|---|---|
| SC1 | $R_1$ | $(X_1, Y_1, Z_1)$ | 100 | Fixed | F1, F2 | F1 | 25 | 0.90 | G11 |
| SC2 | $R_2$ | $(X_2, Y_2, Z_2)$ | 20 | Fixed | F3 | F3 | 10 | 0.20 | |
| SC3 | $R_3$ | $(X_3, Y_3, Z_3)$ | 30 | Fixed | F1 | F1 | 10 | 0.50 | |
| SC4 | $R_4$ | $(X_4, Y_4, Z_4)$ | 200 | Fixed | F2, F3 | F2, F3 | 10 | 0.15 | G12 |
| SC5 | $R_5$ | $(X_5, Y_5, Z_5)$ | 20 | Mobile | F3 | F3 | 0 | 0.00 | |
| .. | .. | .. | .. | .. | .. | .. | .. | .. | .. |

FIG.13

| PATTERN ID | CAPACITY RANGE | TERMINAL NUMBER RANGE | OPERATION MODE PATTERN ||||
|---|---|---|---|---|---|---|
| | | | G11 | G12 | G13 | G14 |
| PT0 | 0 ~ $C_0$ | 0 ~ $N_0$ | Standby | Standby | Standby | Standby |
| PT1 | $C_0$ ~ $C_1$ | $N_0$ ~ $N_1$ | Active | Standby | Standby | Standby |
| PT2 | $C_1$ ~ $C_2$ | $N_1$ ~ $N_2$ | Active | Active | Standby | Standby |
| PT3 | $C_2$ ~ $C_3$ | $N_2$ ~ $N_3$ | Active | Active | Active | Standby |
| PT4 | $C_3$ ~ $C_4$ | $N_3$ ~ $N_4$ | Active | Active | Active | Active |

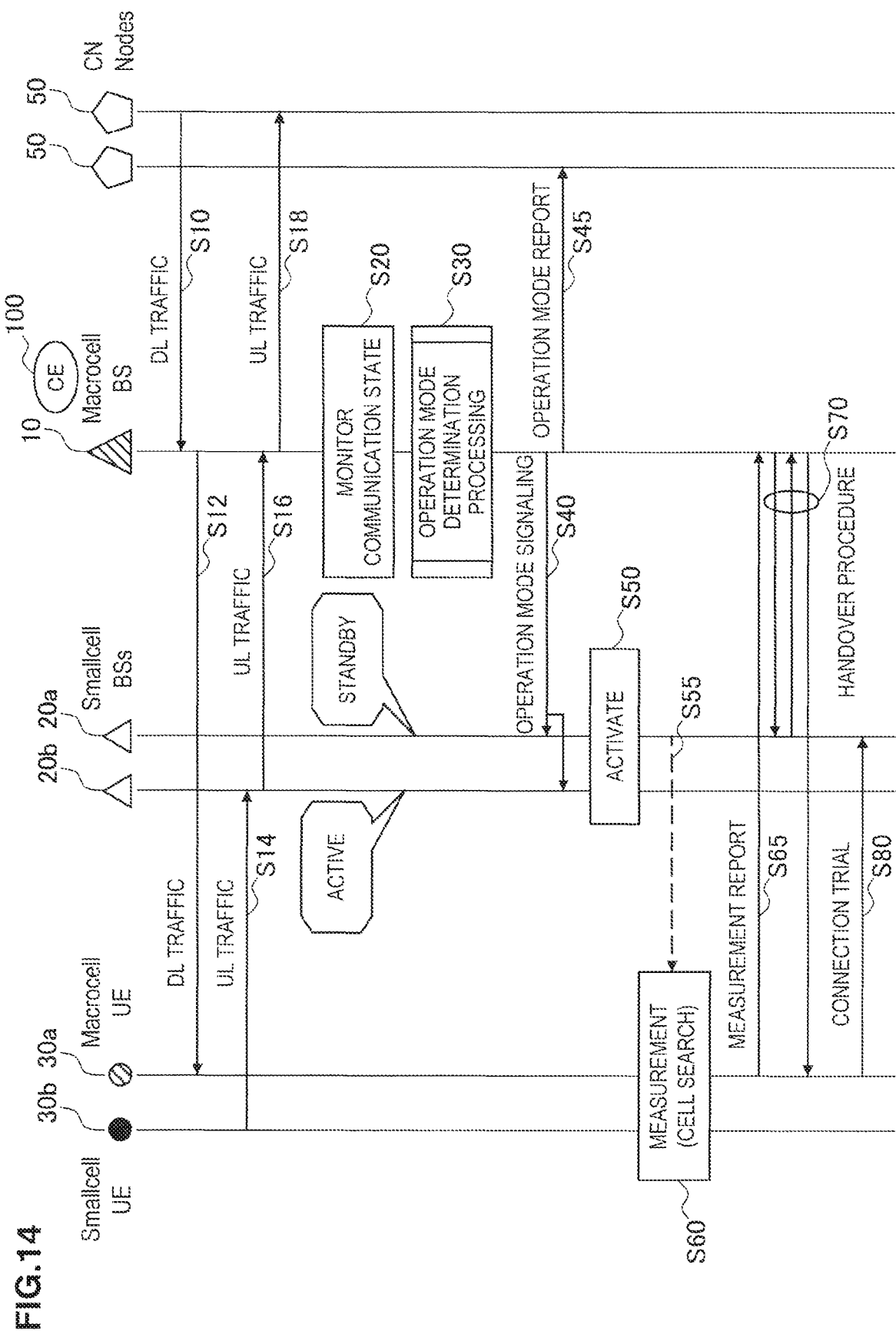

COMMUNICATION CONTROL APPARATUS, COMMUNICATION CONTROL METHOD, RADIO COMMUNICATION APPARATUS, RADIO COMMUNICATION METHOD AND RADIO COMMUNICATION SYSTEM

TECHNICAL FIELD

The present disclosure relates to a communication control apparatus, a communication control method, a radio communication apparatus, a radio communication method and a radio communication system.

BACKGROUND ART

A traffic amount handled in radio communication service has increased rapidly in recent years. In the fourth generation cellular communication service which is scheduled to be in practical use around 2015, it is expected that a data rate of 1 Gbps at a maximum in a semi-fixed environment and 100 Mbps at a maximum in a mobile environment can be achieved. However, because development of a cellular communication system does not catch up with increase of traffic, there still remains a risk of local degradation of a data rate due to increase of system load and occurrence of a network failure. Non-Patent Literature 1 proposes active utilization of a small cell as one of measures against such a risk.

Macro cells which have a relatively large cell size, are disposed adjacent to each other so as to cover a broad geographical area. On the other hand, small cells cover only a relatively narrow area independently. The small cells can be used to complement radio communication service of the macro cells or provide specific service.

When the number of active small cells operating within a service area of the macro cells increases, more radio signals from cells in the vicinity interfere with a radio signal of one cell. Therefore, for example, in a situation where terminal density is low and gain as an effect of offload of traffic is small, increase of active small cells ends up degrading of throughput as the whole system. Non-Patent Literature 2 discloses a simulation result regarding relationship between a ratio of small cells which are activated (turned on) and capacity gain.

CITATION LIST

Non-Patent Literature

Non-Patent Literature 1: NTT DOCOMO, "Text Proposal for TR36.923 on Small Cell Enhancement Scenarios", 3GPP TSG RAN WG1 Meeting #72, Jan. 28 to Feb. 1, 2013, R1-130748

Non-Patent Literature 2: LG Electronics, "Analysis and design considerations of cell on/off in small cell", 3GPP TSG RAN WG1 Meeting #73, Fukuoka, Japan, May 20-24, 2013, R1-132236

SUMMARY OF INVENTION

Technical Problem

As disclosed in Non-Patent Literature 2, it may be beneficial to activate/deactivate (on/off) small cells, that is, dynamically control operation modes in terms of optimization of system capacity. However, increase of signaling associated with control of the operation modes of the small cells can cause a new problem of increase of signaling overhead.

Accordingly, it is desirable to provide a mechanism which enables efficient signaling to control the operation modes of the small cells.

Solution to Problem

According to the present disclosure, there is provided a communication control apparatus including: a communication unit configured to communicate with each of communication nodes operating a plurality of small cells, each of which belongs to at least one of a plurality of small cell groups; a determining unit configured to determine whether operation modes of the plurality of small cells should be set to be an active mode in units of the small cell groups; and a signaling unit configured to signal a control message for specifying the operation modes in units of the small cell groups, determined by the determining unit to the communication nodes via the communication unit.

According to the present disclosure, there is provided a communication control method including: grouping a plurality of small cells in a manner that each small cell belongs to at least one of a plurality of small cell groups in a communication control apparatus which communicates with each of communication nodes operating the plurality of small cells; determining whether operation modes of the plurality of small cells should be set to be an active mode in units of the small cell groups; and signaling a control message for specifying the determined operation modes in units of the small cell groups to the communication nodes.

According to the present disclosure, there is provided a radio communication apparatus including: a radio communication unit configured to operate a first small cell among a plurality of small cells, each of which belongs to at least one of a plurality of small cell groups; and a control unit configured to set an operation mode of the first small cell according to a control message for specifying an operation mode determined for the small cell group to which the first small cell belongs, the control message being signaled from a control node which determines whether operation modes of the plurality of small cells should be set to be an active mode in units of the small cell groups.

According to the present disclosure, there is provided a radio communication method including: in a radio communication apparatus which operates a first small cell among a plurality of small cells, each of which belongs to at least one of a plurality of small cell groups, receiving a control message for specifying an operation mode determined for a small cell group to which the first small cell belongs, the control message being signaled from a control node which determines whether operation modes of the plurality of small cells should be set to be an active mode in units of the small cell groups; and setting the operation mode of the first small cell according to the received control message.

According to the present disclosure, there is provided a radio communication system including: a communication control apparatus which includes a plurality of communication nodes configured to operates a plurality of small cells, each of which belongs to at least one of a plurality of small cell groups, a determining unit configured to determine whether operation modes of the plurality of small cells should be set to be an active mode in units of the small cell groups, and a signaling unit configured to signal a control message for specifying the operation modes in units of the small cell groups, determined by the determining unit to the plurality of communication nodes.

Advantageous Effects of Invention

According to the technique according to the present disclosure, it is possible to efficiently perform signaling to control operation modes of small cells.

Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 4 is an explanatory diagram illustrating some examples of arrangement of control entities.

FIG. 7A is a first explanatory diagram for explaining activation of small cells in units of the small cell groups in the first configuration example.

FIG. 7B is a second explanatory diagram for explaining activation of small cells in units of the small cell groups in the first configuration example.

FIG. 12 is an explanatory diagram illustrating one example of a configuration of small cell data.

FIG. 13 is an explanatory diagram illustrating one example of a configuration of an operation mode table.

FIG. 14 is a sequence diagram illustrating one example of flow of communication control processing according to one embodiment.

DESCRIPTION OF EMBODIMENTS

Hereinafter, a preferred embodiment of the present disclosure will be described in detail with reference to the appended drawings. In this specification and the drawings, elements that have substantially the same function and structure are denoted with the same reference signs, and repeated explanation is omitted.

Further, the description will be provided in the following order.

1. Outline of System
2. Configuration Example of Communication Control Apparatus
  2-1. Configuration of Each Unit
  2-2. Configuration of Small Cell Group
  2-3. Control Message
  2-4. Data Configuration
  2-5. Processing Flow
3. Configuration Example of Radio Communication Apparatus
  3-1. Configuration of Each Unit
  3-2. Processing Flow
4. Application to Spectrum Access System (SAS)
5. Application Example
6. Conclusion

1. OUTLINE OF SYSTEM

Figure 1:
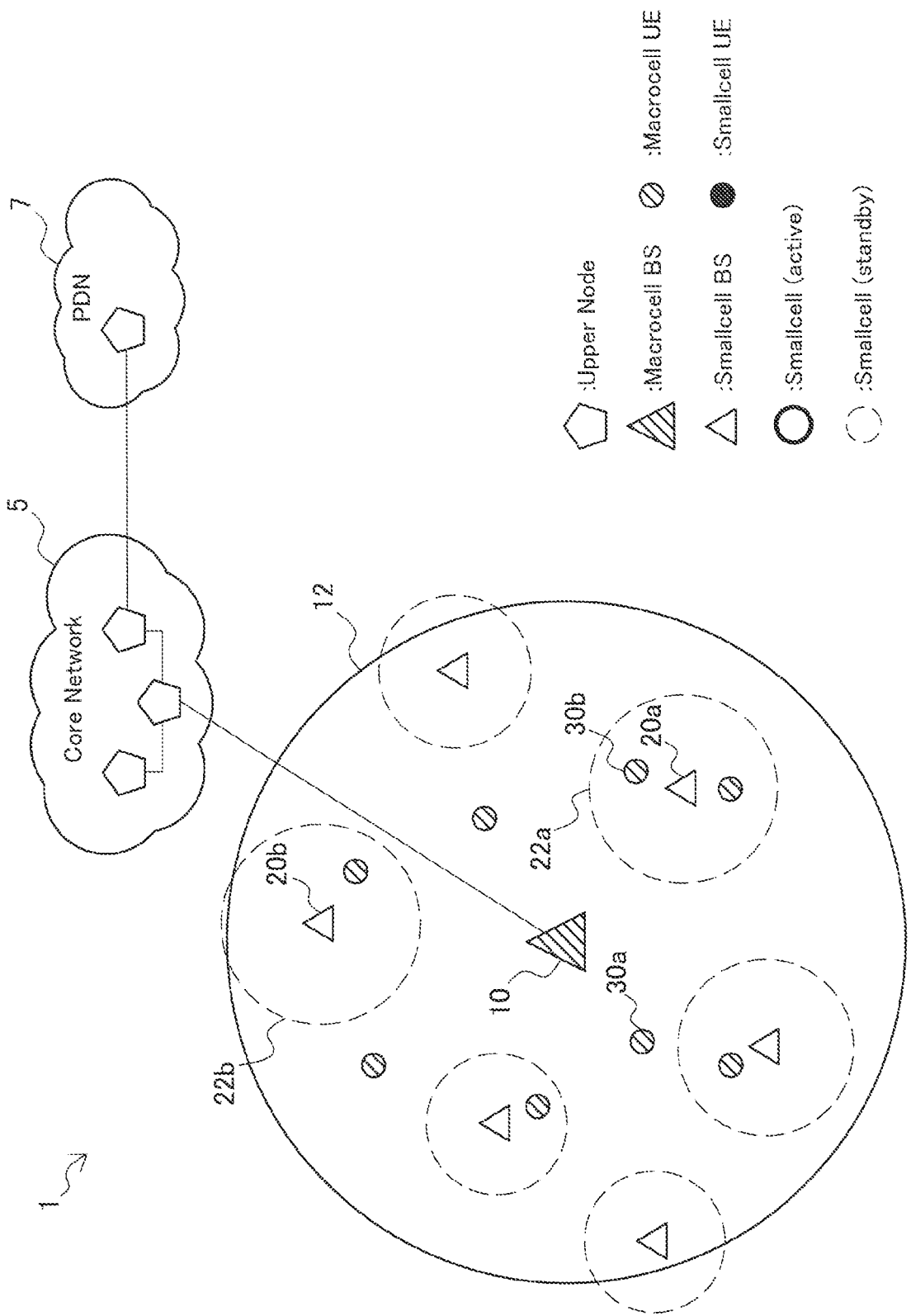
FIG. 1 is a first explanatory diagram for explaining outline of a radio communication system to which a technique according to the present disclosure is to be applied.
Figure 2:
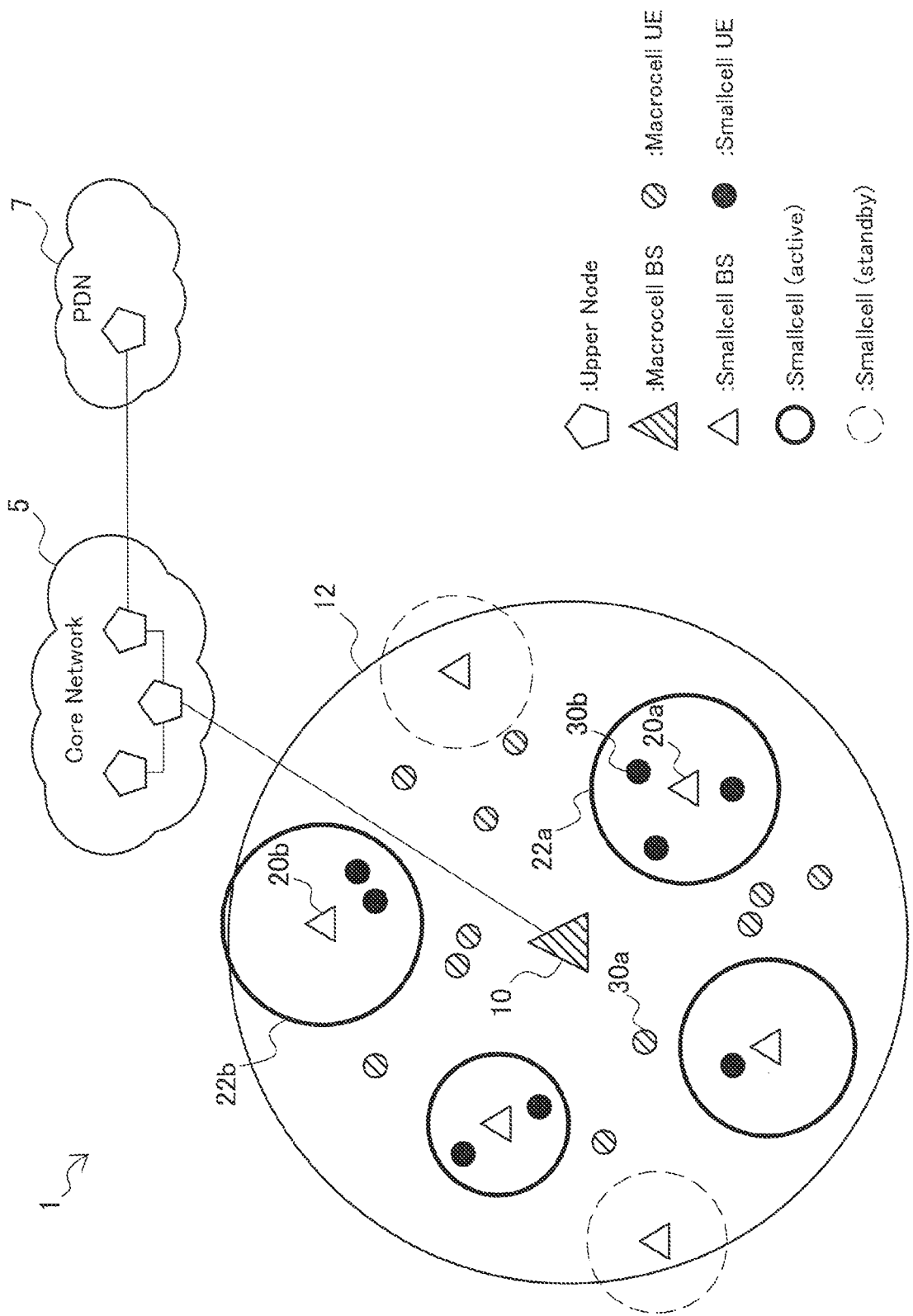
FIG. 2 is a second explanatory diagram for explaining outline of a radio communication system to which a technique according to the present disclosure is to be applied.

FIG. 1 and FIG. 2 are explanatory diagrams for explaining an outline of a radio communication system 1 to which a technique according to the present disclosure is to be applied. Referring to FIG. 1, the radio communication system 1 includes a macro cell base station 10, a plurality of small cell base stations, and a plurality of terminal apparatuses.

The macro cell base station 10 is a base station which provides first radio communication service within a macro cell 12. The macro cell base station 10 can operate the macro cell 12, for example, by being legally approved, or by utilizing a frequency channel for which right of use or right of preferential use is provided. The macro cell base station 10 may operate the macro cell 12 using a frequency division duplex (FDD) scheme, or may operate the macro cell 12 using a time division duplex (TDD) scheme. The terminal apparatuses located within the macro cell 12 can be connected to the macro cell base station 10. In the example of FIG. 1A, a plurality of terminal apparatuses including a terminal apparatus 30a are connected to the macro cell base station 10. A terminal apparatus connected to the macro cell base station will be also referred to as a macro cell terminal.

Small cell base stations 20a and 20b are base stations which respectively provide second radio communication service within the macro cell 12. In the present specification, the small cell is concept including a femto cell, a nano cell, a pico cell, a micro cell and a relay cell. The second radio communication service may be radio communication service substantially equivalent to the first radio communication service, which increases capacity of the first radio communication service, for example, at a hot spot. Alternatively, the second radio communication service may be radio communication service different from the first radio communication service (for example, in terms of a frequency band being used, a radio access technique or a service provider). The second radio communication service may be provided by secondarily utilizing a frequency channel for the first radio communication service.

In one embodiment, the small cell base station can operate in at least two operation modes of an active mode and a standby mode. In the present specification, the active mode refers to a mode in which the small cell base station transmits various signals required for the terminal to be connected to the small cell.

The signal required for the terminal to be connected to the small cell can include, for example, a reference signal (also referred to as a beacon signal, a pilot signal or a synchronization signal) on downlink and other control signals. In the active mode, power and clock are continuously supplied to a radio communication circuit and a control circuit of the small cell base station. On the other hand, the standby mode refers to a mode in which a control signal such as a reference signal is not transmitted (or at least, transmission frequency of the control signal is suppressed). In the standby mode, power and clock are, for example, intermittently supplied or not supplied to the radio communication circuit of the small cell base station. The concept of the standby mode can include an inactive mode, an idle mode, a sleep mode and a dormant mode. In the standby mode, any part of a radio frequency (RF) unit or a digital unit or both of them of the radio communication circuit may be turned off. It should be noted that the small cell base station may further be able to operate in an operation mode different from the active mode and the standby mode.

In the example of FIG. 1, the small cell base stations 20a and 20b operate in the standby mode. The small cell base station 20a does not transmit a reference signal for the small cell 22a. Therefore, a terminal apparatus 30b located in the vicinity of the small cell base station 20a is connected to the macro cell base station 10 instead of being connected to the small cell base station 20a. On the other hand, in the example of FIG. 2, a plurality of small cell base stations including the small cell base stations 20a and 20b operate in the active mode. The small cell base station 20a transmits a reference signal for the small cell 22a on downlink. The small cell base station 20b transmits a reference signal for the small cell 22b on downlink. The terminal apparatus 30b located in the vicinity of the small cell base station 20a is connected to the small cell base station 20a. A terminal apparatus connected to the small cell base station will be also referred to as a small cell terminal.

It should be noted that in the present specification, when it is not necessary to distinguish between the small cell base stations 20a and 20b, by abbreviating an alphabetical character at the tail end of the reference numeral, these are collectively referred to as a small cell base station 20. The same will also apply to other components such as the small cells 22a and 22b (small cell 22) and terminal apparatuses 30a and 30b (terminal apparatus 30).

The small cell base station 20 is connected to the macro cell base station 10 via a back haul link. The back haul link may be a wired link or a radio link. The macro cell base station 10 is connected to a core network 5. The core network 5 includes a plurality of upper nodes which respectively have roles such as management of user information, management of mobility of terminals, transferring of packets and a role as a gateway, or the like. The small cell base station 20 may be also connected to the core network 5. It should be noted that the small cell base station 20 may be connected to the core network 5 and the macro cell base station 10 via a packet data network (PDN) 7. The PDN 7 includes, for example, Internet.

As in the example of FIG. 1, when most of the small cell base stations 20 located within the macro cell 12 are set to operate in the standby mode, signals are not transmitted from these small cell base stations 20 on downlink (access link with small cell terminals). In this case, interference with a desired signal transmitted and received between the macro cell base station 10 and the macro cell terminal is reduced. Particularly, in a situation where there is a small traffic amount occurring in the macro cell 12 or terminal density is low, it is more beneficial to obtain capacity gain by reducing interference than to distribute traffic by utilizing small cells. On the other hand, in a situation where terminal density increases and a large traffic amount occurs as in the example of FIG. 2, it is possible to optimize system capacity by activating some small cells and distributing (off-loading) load of traffic among the macro cell and active small cells.

However, while FIG. 1 and FIG. 2 merely illustrate a small number of small cells for the purpose of simplicity, the number of small cell base stations deployed in the macro cell in an actual environment can reach several tens to several hundreds. Accordingly, if individual signaling is frequently exchanged between control entities and the small cell base stations to dynamically control the operation modes of the small cells, a significant amount of signaling overhead will occur. Therefore, in the technique according to the present disclosure, by grouping a plurality of small cells into small cell groups and introducing control entities which control the operation modes in units of the small cell groups, increase of signaling associated with dynamic control of the operation modes is suppressed.

The control entities group a plurality of small cells disposed in a given management area into small cell groups. The small cells may be grouped using any standard. However, while in a clustering technique disclosed in Non-Patent Literature 1, a group of small cells which are disposed geographically close to each other form one small cell cluster, in the technique according to the present disclosure, each small cell group includes a plurality of small cells disposed in a distributed manner over the management area.

By this means, it is easy to adjust a ratio of active small cells according to a traffic state within the management area. Some examples of the configuration of the small cell groups will be described further later.

Figure 3A:
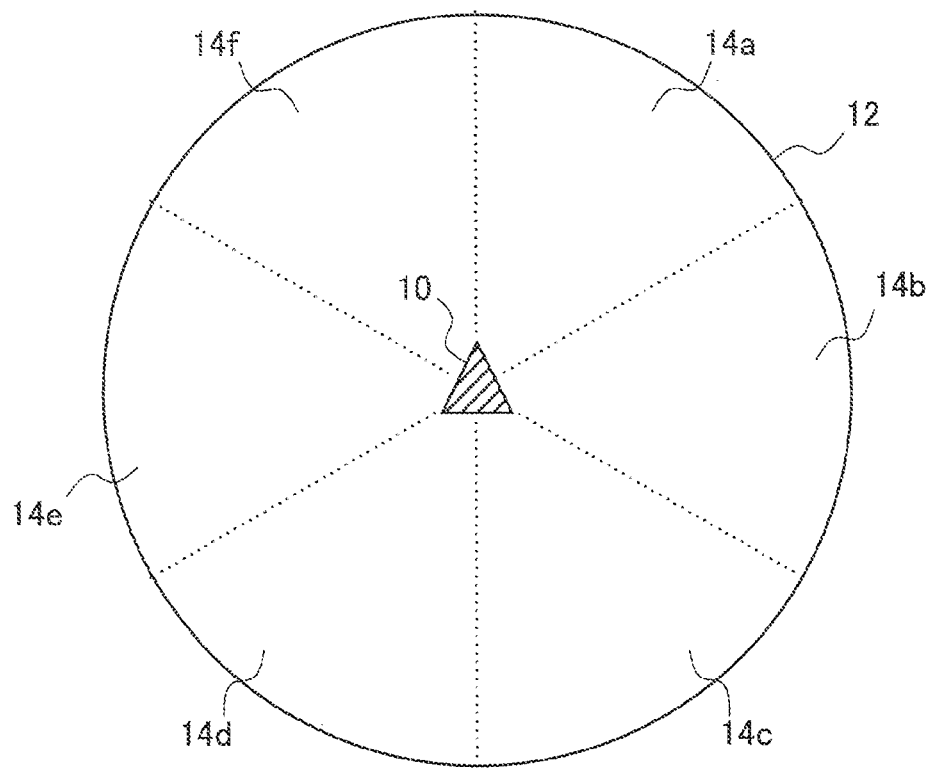
FIG. 3A is an explanatory diagram illustrating a first example of sector division of a macro cell.
Figure 3B:
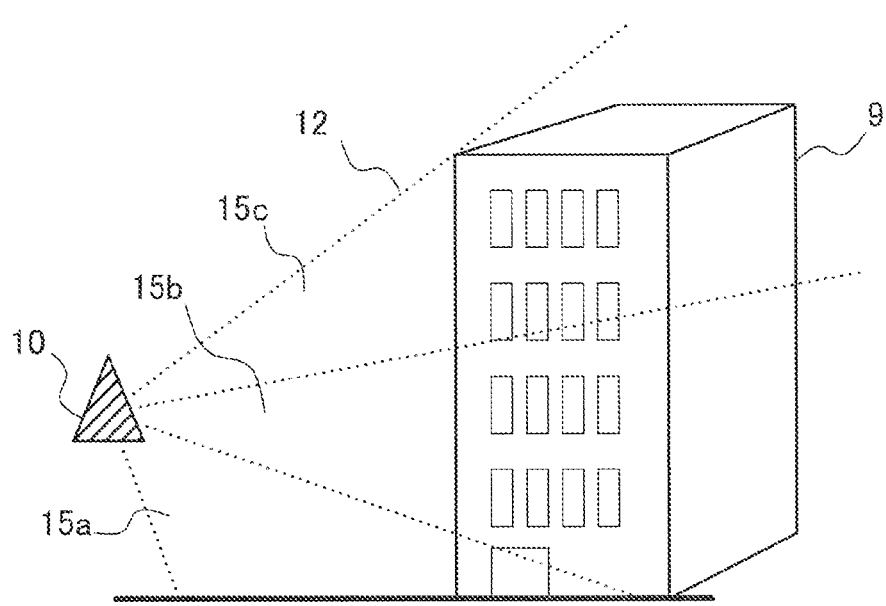
FIG. 3B is an explanatory diagram illustrating a second example of sector division of a macro cell.

In one example, the management area can correspond to a macro cell. In this case, the control entities determine small cell groups for which the operation modes of the small cells should be activated for each macro cell. In other examples, the management area can correspond to each sector of the macro cell. In this case, the control entities determine small cell groups for which the operation modes of the small cells should be activated for each sector. While an effect of reduction of signaling overhead increases when the management area is larger, finer control can be performed on the operation mode when the management area is smaller. Referring to FIG. 3A, the macro cell 12 includes six sectors 14*a* to 14*f* divided into equal parts in an azimuth angle. The management area may be equal to the macro cell 12 or may be equal to each of the sectors 14*a* to 14*f*. The macro cell may be divided into sectors in a three dimensional manner. Referring to FIG. 3B, the macro cell 12 includes three sectors 15*a* to 15*c* divided in an elevation/depression angle. The sector 15*a* covers the vicinity of the ground, the sector 15*b* covers lower floors of a building 9, and the sector 15*c* cover higher floors of the building 9. The management area may be equal to each of the sectors 15*a* to 15*c*.

The control entities may be implemented on various kinds of nodes relating to radio communication. FIG. 4 illustrates some examples of arrangement of the control entities. As a first example, the control entity 100*a* is disposed at the macro cell base station 10. As a second example, the control entity 100*b* is disposed at the small cell base station 20. As a third example, the control entity 100*c* is disposed at a node within the core network 5. As a fourth example, the control entity 100*d* is disposed at a node within the PDN 7. In any case, the control entities communicate with each of the small cell base stations which operate the small cells, and signal the operation modes determined in units of the small cell groups to the small cell base stations. An exemplary embodiment for realizing such a mechanism will be described in detail in the following section.

2. CONFIGURATION EXAMPLE OF COMMUNICATION CONTROL APPARATUS

In this section, it is assumed that the control entity is implemented on the macro cell base station 10. However, this description can be also applied to a case where the control entities are implemented on other kinds of nodes.

Figure 5:
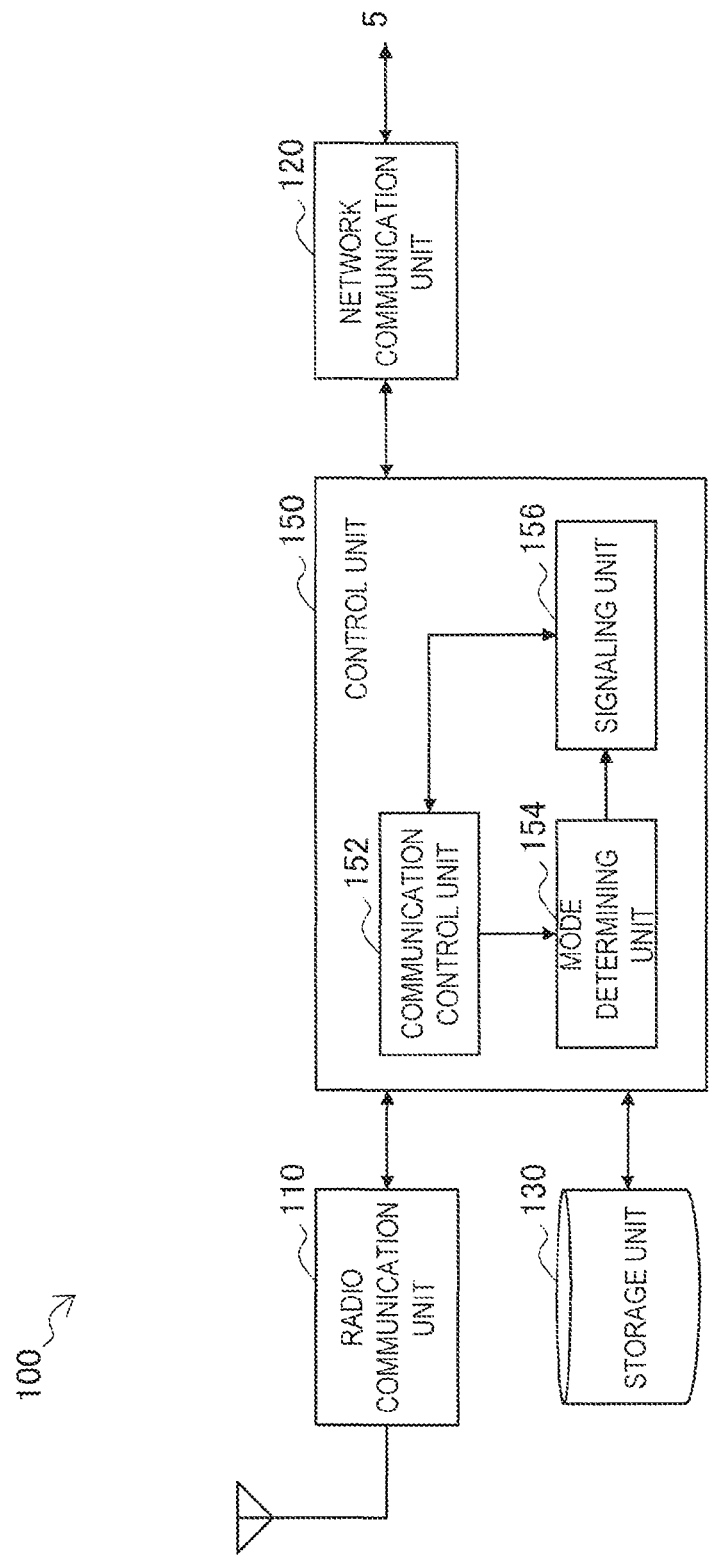
FIG. 5 is a block diagram illustrating one example of a configuration of a communication control apparatus according to one embodiment.

FIG. 5 is a block diagram illustrating one example of a configuration of the communication control apparatus 100 according to one embodiment. The communication control apparatus 100 corresponds to the macro cell base station 10 at which the above-described control entity is implemented. The communication control apparatus 100 includes a radio communication unit 110, a network communication unit 120, a storage unit 130 and a control unit 150.

2-1. Configuration of Each Unit

(1) Radio Communication Unit

The radio communication unit 110 provides first radio communication service to the terminal apparatuses 30 located within the macro cell 12. For example, the radio communication unit 110 transmits a reference signal on downlink. The reference signal is searched by the terminal apparatuses 30 during procedure of cell selection or cell reselection. Further, the terminal apparatuses 30 derive communication quality for each cell which becomes a basis of handover determination by executing measurement for the reference signal. Further, the radio communication unit 110 transmits system information on a downlink broadcast channel. The system information on the broadcast channel generally includes static control information (also referred to as a white list) such as an operation frequency band of the macro cell 12 and the number of antennas of the radio communication unit 110. Dynamic control information can be transmitted in a control information area (for example, a system information block (SIB)) on a shared channel. The radio communication unit 110 establishes a radio bearer for each of the terminal apparatuses 30 connected to the macro cell base station 10. The radio bearer receives uplink traffic from the terminal apparatuses 30 on uplink and transmits downlink traffic to the terminal apparatuses 30 on downlink. Uplink and downlink data rates can be adjusted according to a quality of service (QoS) class of each terminal.

(2) Network Communication Unit

The network communication unit 120 mediates communication between the macro cell base station 10, and upper nodes within the core network 5, other macro cell base stations and the small cell base station 20. As one example, when the macro cell base station 10 operates using an LTE scheme or an LTE-A scheme, the network communication unit 120 establishes communication links called an S1-U interface and an S1-MME interface respectively with a serving-gateway (S-GW) and a mobility management entity (MME) within the core network 5. Further, the network communication unit 120 establishes a communication link called an X2 interface with other macro cell base stations. Still further, the network communication unit 120 establishes the above-described back haul link with the small cell base station 20 operating within the macro cell 12. It should be noted that a radio link between the radio communication unit 110 and the small cell base station 20 may be utilized as a radio back haul link.

(3) Storage Unit

The storage unit 130 stores a program and data for operation of the macro cell base station 10 using a storage medium such as a hard disk and a semiconductor memory. The data stored by the storage unit 130 can include, for example, small cell data 131 which will be described later and an operation mode table 145.

(4) Control Unit

The control unit 150 controls general operation of the communication control apparatus 100 using a processor such as a central processing unit (CPU) and a digital signal processor (DSP). In the present embodiment, the control unit 150 includes a communication control unit 152, a mode determining unit 154 and a signaling unit 156.

(4-1) Communication Control Unit

The communication control unit 152 controls provision of the first radio communication service. For example, the communication control unit 152 makes the network communication unit 120 transfer uplink data traffic received by the radio communication unit 110 to the core network 5 or other macro cell base stations or the small cell base station 20 depending on its address. Further, the communication control unit 152 makes the radio communication unit 110 transmit downlink data traffic received from other nodes by the network communication unit 120 to the terminal apparatus 30 to which the downlink data traffic is addressed. Further, the communication control unit 152 makes the radio communication unit 110 receive a report indicating communication quality of downlink measured by the terminal apparatus 30 (for example, a measurement report or a channel quality indicator (CQI) report). Further, the communication control unit 152 makes the radio communication unit 110 measure communication quality of uplink.

(4-2) Mode Determining Unit

The mode determining unit 154 determines which operation mode should be set for each of the plurality of small cells 22 disposed within the macro cell 12 in units of the small cell groups. The mode determining unit 154 may periodically determine the operation modes. Further, the mode determining unit 154 may execute determination of the operation modes triggered by occurrence of events such as reception of a determination request from any node, newly registration or elimination of a small cell and change of a monitored index.

In the present embodiment, the small cells 22 respectively belong to at least one of the plurality of small cell groups. The mode determining unit 154 determines the operation modes using a determination index relating to system capacity requirements in units of the small cell groups. As described above, candidates of the operation modes include at least the active mode and the standby mode. Typically, the mode determining unit 154 determines the operation modes for each small cell group so as to increase density of active small cells in the management area when the determination index indicates that larger system capacity is required. Adversely, the mode determining unit 154 determines the operation modes for each small cell group so as to reduce density of active small cells in the management area when the determination index indicates that only small system capacity is required.

As one example, the determination index relating to the system capacity requirements may include an actual traffic amount actually occurring in the management area. As another example, the determination index relating to the system capacity requirements may include a predicted traffic amount predicted to occur in the management area. These traffic amounts can be expressed using, for example, the number of bits per unit time. For example, the mode determining unit 154 can predict the traffic amount based on the QoS classes of the terminals existing in the management area. When the actual traffic amount or the predicted traffic amount is higher, it is desired to secure larger system capacity. Adversely, when the actual traffic amount or the predicted traffic amount is lower, it is desirable to reduce interference within the management area by refraining from activating too many small cells.

Further, as another example, the determination index relating to system capacity requirements may include the number of terminals existing in the management area. The number of terminals here may be a total number of terminals or the number of active terminals. To count the number of terminals, the number of radio bearers at the radio communication unit 110 may be counted. When the counted number of terminals is larger, it is desired to secure larger system capacity. Adversely, when the number of terminals is smaller, it is desirable to reduce interference within the management area by refraining from activating too many small cells.

The mode determining unit 154 may switch the above-described determination index to be used for determination of the operation mode according to terminals handled within the system or types of traffic. For example, a machine type communication (MTC) terminal which performs machine to machine (M2M) communication steadily causes a relatively small amount of traffic. Therefore, while, for a normal user terminal, a traffic amount which directly affects load of the system is suitable as the determination index, for the MTC terminal, it can be said that it is beneficial to use the number of terminals as the determination index given easiness of counting. Therefore, the mode determining unit 154 can use the number of terminals as the determination index when M2M communication or the MTC terminal is handled, and, otherwise, can use the (actual or predicted) traffic amount as the determination index.

In one example, the storage unit 130 stores the operation mode table 145 which maps a value of the determination index and the operation mode for each small cell group. The mode determining unit 154 acquires data corresponding to the value of the continuously monitored determination index from the operation mode table 145 and determines the operation modes in units of the small cell groups. According to this configuration, it is possible to promptly determine optimal operation modes according to the latest state within the management area without requiring complicated operation. The mode determining unit 154 may switch a table to be used for determination of the operation modes according to temporal conditions (for example, day of week or a time zone). For example, tendency of a location where traffic occurs differs between weekdays and holidays, or between daytime and early morning/midnight. Accordingly, by switching the operation mode table according to the temporal conditions, it is possible to make the operation modes of the small cells conform to movement of the user more appropriately.

In other examples, the mode determining unit 154 determines an optimal pattern of the operation mode for each small cell group conforming to the value of the determination index by sequentially scanning a plurality of patterns and verifying compatibility with the determination index. According to this configuration, it is possible to dynamically control the operation modes in units of the small cell groups without storing the above-described operation mode table in advance.

It should be noted that there is a case where the small cells are dynamically operated by a mobile terminal operating as the macro cell terminal or the small cell terminal temporarily executing a base station function. In the present specification, such a mobile terminal is referred to as a dynamic AP, and the small cell operated by the dynamic AP is referred to as a dynamic cell. Typically, performance (of a processor, a memory, a battery, or the like) of the dynamic AP is inferior to that of a fixed base station. Therefore, the mode determining unit 154 may determine to preferentially set the operation mode of a first small cell group to which the dynamic cell does not belong to be an active mode over a second small cell group to which the dynamic cell belongs. For example, a special small cell group including the dynamic AP (therefore, can be activated only when advanced load distribution is required) may be defined.

(4-3) Signaling Unit

The signaling unit 156 executes signaling for controlling the operation modes of the small cells via the back haul link established between the communication control apparatus 100 and each small cell base station 20. For example, the signaling unit 156 signals an allocation message indicating allocation of the small cell groups to the small cell base stations 20 which operate the small cells upon initial registration of each small cell. Further, the signaling unit 156 signals a control message for specifying the operation modes in units of the small cell groups determined by the mode determining unit 154 to each small cell base station 20. The control message is typically, broadcasted or multicasted to the plurality of small cell base stations 20 on the back haul link.

In one example, the above-described control message may include a set of flags indicating the determined operation mode for each small cell group. For example, it is assumed that there are two candidates (an active mode and a standby mode) for the operation mode, and the total number of small cell groups is M. In this case, it is possible to specify the determined operation modes for all the small cells only with a bit sequence of M bits. Alternatively, the above-described control message may include identification information of the small cell group for which it is determined that the active mode should be set. Some examples of a format of the control message will be described in detail later.

2-2. Configuration of Small Cell Group (1) First Configuration Example

Figure 6:
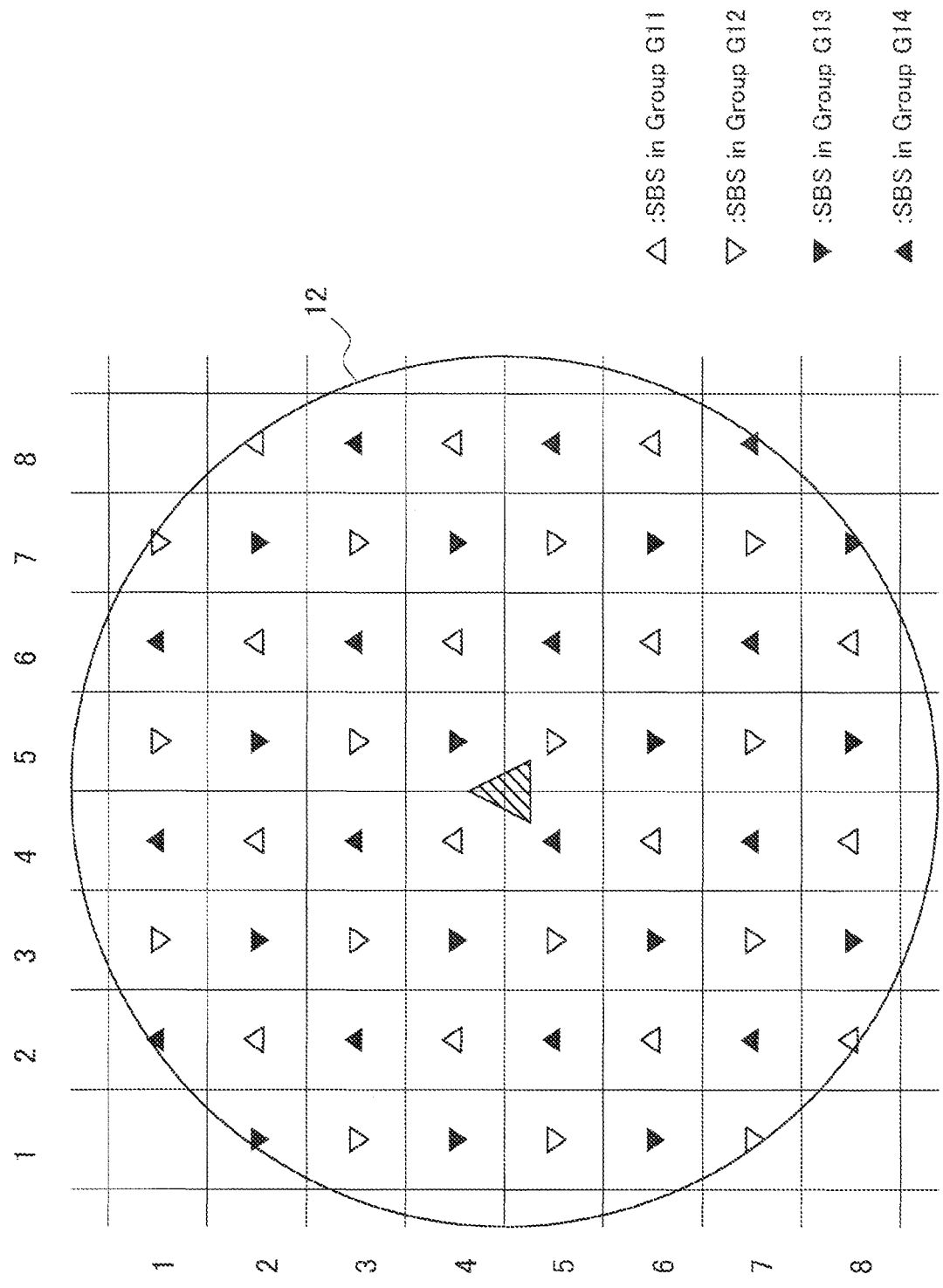
FIG. 6 is an explanatory diagram for explaining a first configuration example of small cell groups.

FIG. 6 is an explanatory diagram for explaining a first configuration example of the small cell group. Referring to FIG. 6, a geographical area covered by the macro cell 12 is divided into a plurality of grid-like segments. Small cells operated by the small cell base stations (SBS) 20 located in every other selected segments in a longitude (lateral) direction and in a latitude (longitudinal) direction form one small cell group.

Here, for convenience of explanation, each segment is expressed with a segment SG[m, n] using an index m in the longitude direction and an index n in the latitude direction. For example, the small cell group G11 includes small cells operated by the small cell base stations 20 illustrated with hollow upward triangles, located in a segment SG[$2i$, $2j$] (where i, j are arbitrary natural numbers). The small cell group G12 includes small cells operated by the small cell base stations 20 illustrated with hollow downward triangles, located in a segment SG[$2i-1$, $2j-1$]. The small cell group G13 includes small cells operated by the small cell base stations 20 illustrated with solid downward triangles, located in a segment SG[$2i-1$, $2j-1$]. The small cell group G14 includes small cells operated by the small cell base stations 20 illustrated with solid upward triangles, located in a segment SG[$2i$, $2j-1$]. That is, each of these small cell groups G11, G12, G13 and G14 includes a plurality of small cells disposed over the macro cell 12 in a distributed manner.

It should be noted that an example where small cells are uniformly distributed is described here for simplicity of explanation. However, actually, there may be a segment where a small cell does not exist. Further, the number of small cells (density) for each segment may be different, and, for example, more small cells may be disposed in a segment which is statistically known as a segment where traffic concentrates. Further, the shape and the size of the segment may not be uniform.

FIG. 7A and FIG. 7B are explanatory diagrams for explaining activation of small cells in units of the small cell groups in the first configuration example illustrated in FIG. 6. In the first configuration example, each small cell belongs to a single small cell group (that is, one of the small cell groups G11, G12, G13 and G14). The mode determining unit 154 determines that the operation modes of more small cell groups should be set to be the active mode when the determination index indicates that larger system capacity is required. For example, in the macro cell 12, when the determination index relating to the system capacity requirements indicates the lowest value, the operation modes are set to be the standby mode for all the small cell groups G11, G12, G13 and G14. When the determination index increases to some extent, as illustrated with the shaded segment in FIG. 7A, the mode determining unit 154 activates the small cell group G11. When the determination index further increases, as illustrated with the shaded segment in FIG. 7B, the mode determining unit 154 additionally activates the small cell group G12. When the determination index continues to further increase, the mode determining unit 154 can sequentially and additionally activate the small cell groups G13 and G14.

(2) Second Configuration Example

Figure 8:
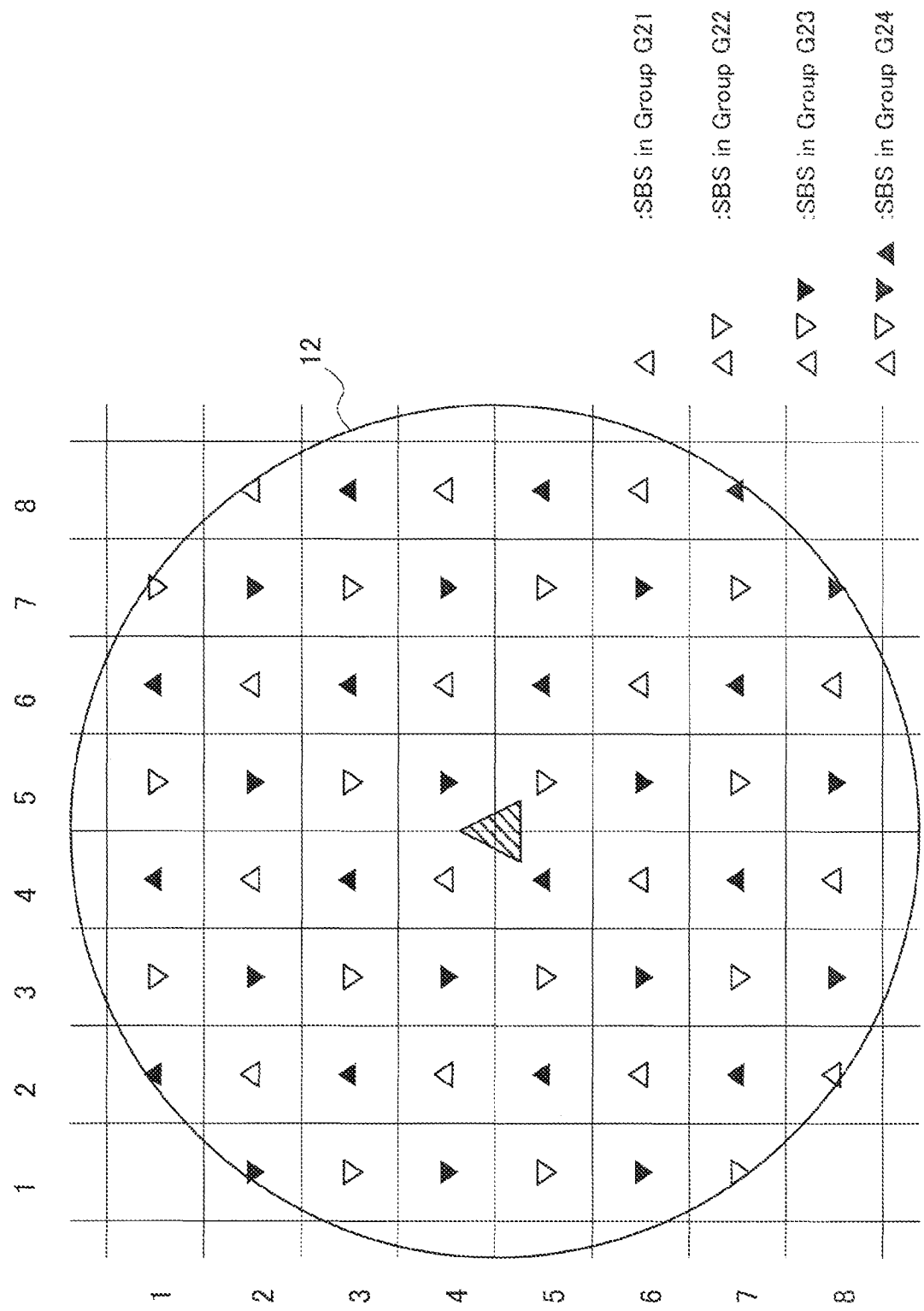
FIG. 8 is an explanatory diagram for explaining a second configuration example of the small cell groups.

FIG. 8 is an explanatory diagram for explaining a second configuration example of the small cell groups. In the second configuration example, each small cell belongs to one or more small cell groups and the plurality of small cell groups include different numbers of small cells. For example, the small cell group G21 includes small cells operated by the small cell base stations 20 illustrated with hollow upward triangles, located in a segment SG[$2i$, $2j$] (where i, j are arbitrary natural numbers). The small cell group G22 includes small cells operated by the small cell base stations 20 illustrated with hollow downward triangles, located in a segment SG[$2i-1$, $2j-1$], in addition to the small cells included in the small cell group G21. The small cell group G23 includes small cells operated by the small cell base stations 20 illustrated with solid downward triangles, located in a segment SG[$2i-1$, $2j$], in addition to the small cells included in the small cell group G22. The small cell group G24 includes small cells operated by the small cell base stations 20 illustrated with solid upward triangles, located in a segment SG[$2i$, $2j-1$], in addition to the small cells included in the small cell group G23. Also in the second configuration example, each of the small cell groups G21, G22, G23 and G24 includes a plurality of small cells disposed over the macro cell 12 in a distributed manner. It should be noted that as with the first configuration example, actually, there may be a segment where a small cell does not exist. Further, the number of small cells (density) for each segment may be different.

Figure 9A:
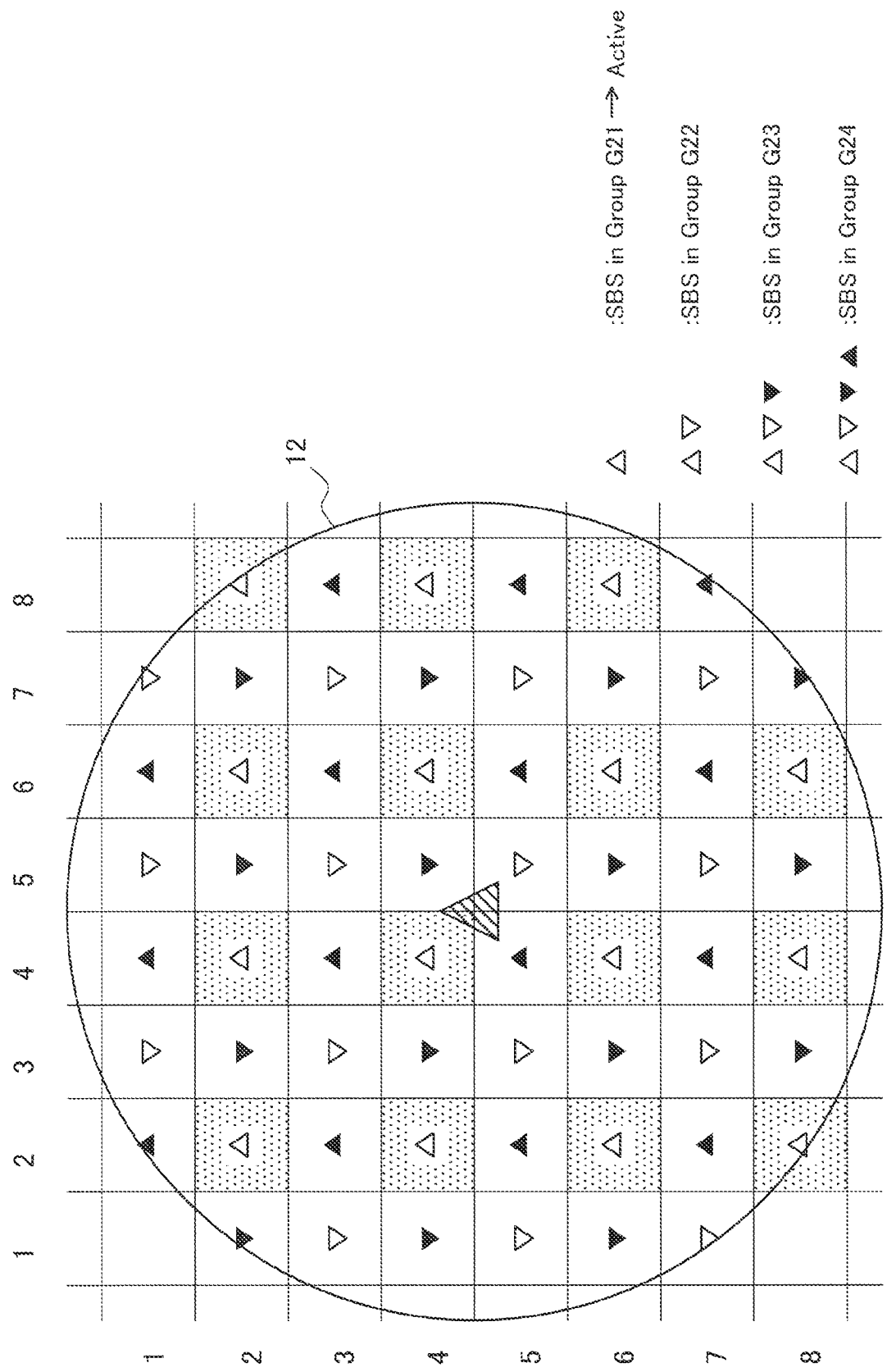
FIG. 9A is a first explanatory diagram for explaining activation of small cells in units of the small cell groups in the second configuration example.
Figure 9B:
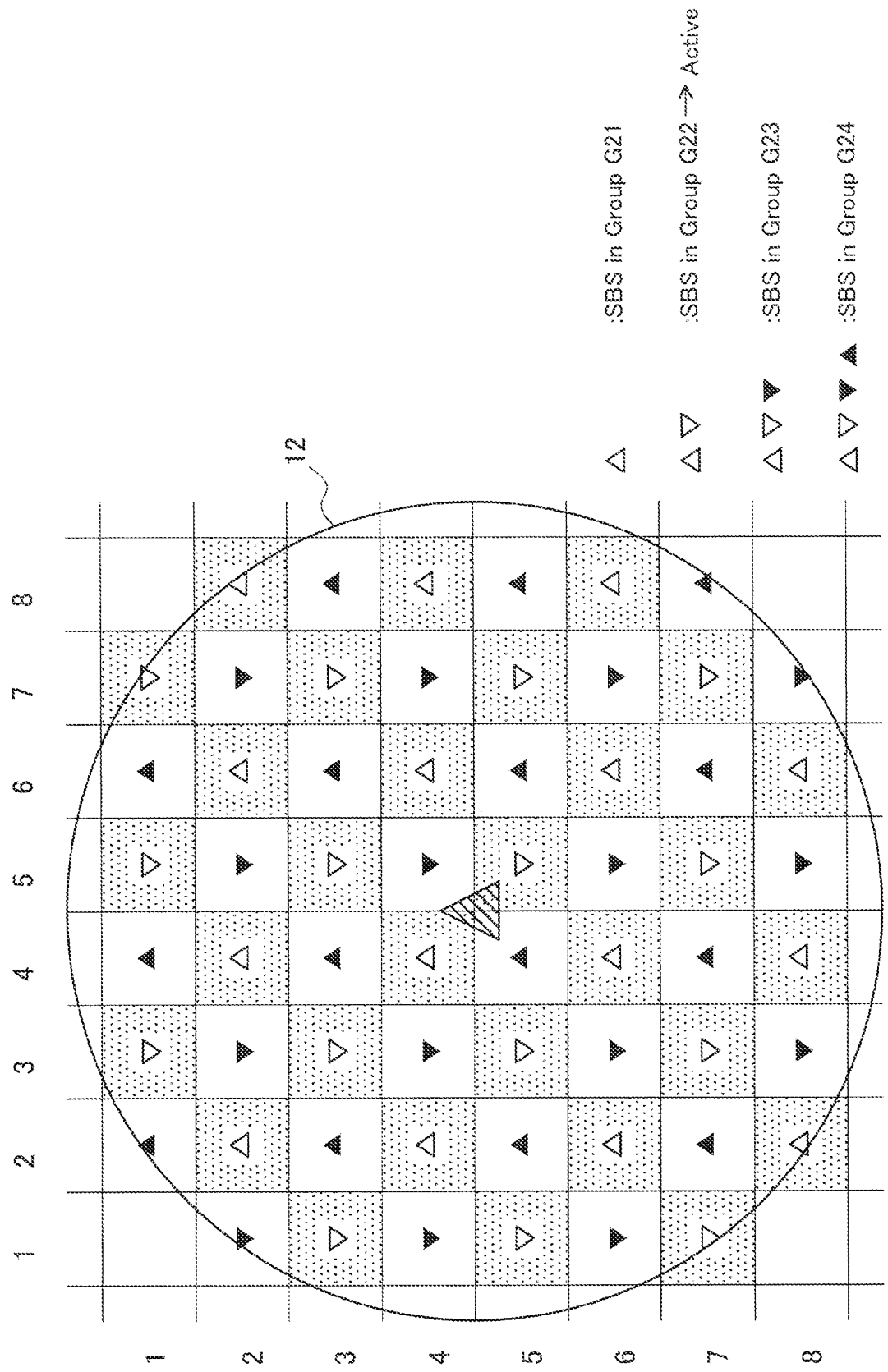
FIG. 9B is a second explanatory diagram for explaining activation of small cells in units of the small cell groups in the second configuration example.

FIG. 9A and FIG. 9B are explanatory diagrams for explaining activation of the small cells in units of the small cell groups in the second configuration example illustrated in FIG. 8. In the second configuration example, the mode determining unit 154 determines that the operation modes of the small cell groups including more small cells should be set to an active mode when the determination index indicates that larger system capacity is required. For example, in the macro cell 12, when the determination index relating to the system capacity requirements is the lowest value, the operation modes are set to be a standby mode for all the small cell groups G21, G22, G23 and G24. When the determination index increases to some extent, as illustrated with the shaded segment in FIG. 9A, the mode determining unit 154 activates the small cell group G21. When the determination index further increases, as illustrated with the shaded segment in FIG. 9B, the mode determining unit 154 activates the small cell group G22 in place of the small cell group G21. When the determination index continues to further increase, the mode determining unit 154 can sequentially activate the small cell group G23 in place of the small cell group G22, and further, the small cell group G24 in place of the small cell group G23.

(3) Control of Operation Mode for Each Sector

Figure 10:
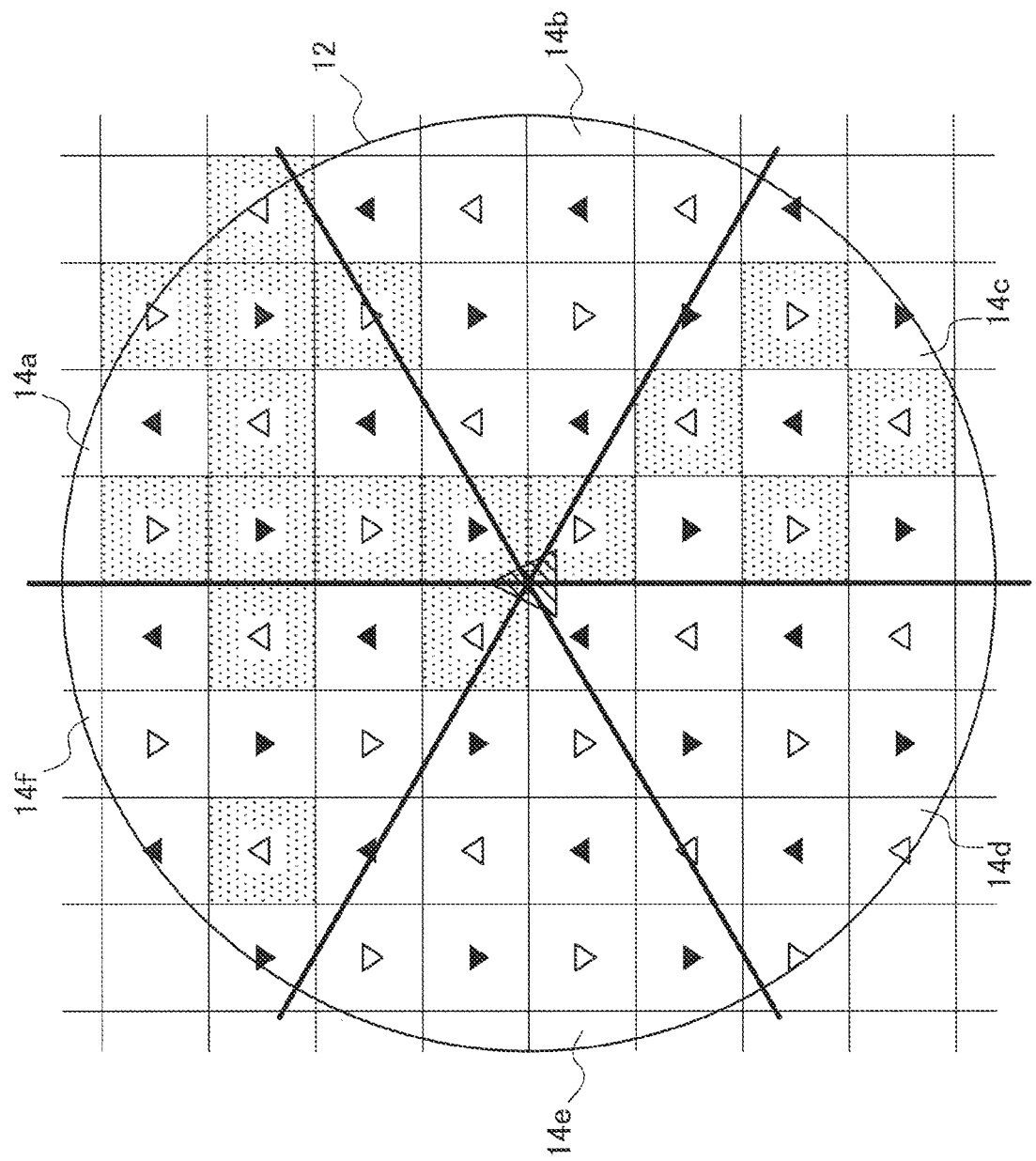
FIG. 10 is an explanatory diagram for explaining control of operation modes for each sector.

In the above-described first configuration example and the second configuration example of the small cell groups, the macro cell 12 can correspond to the management area. Meanwhile, FIG. 10 illustrates an example where each sector of the macro cell 12 corresponds to the management area. Referring to FIG. 10, the macro cell 12 is divided into six sectors 14a to 14f. The mode determining unit 154 can determine the operation modes in units of the small cell groups separately for these sectors 14a to 14f. For example, a ratio of the active small cells is 75% in the sector 14a, 0% in the sector 14b, 50% in the sector 14c, 0% in the sector 14d, 0% in the sector 14e and 25% in the sector 14f.

2-3. Control Message (1) First Example

Figure 11A:
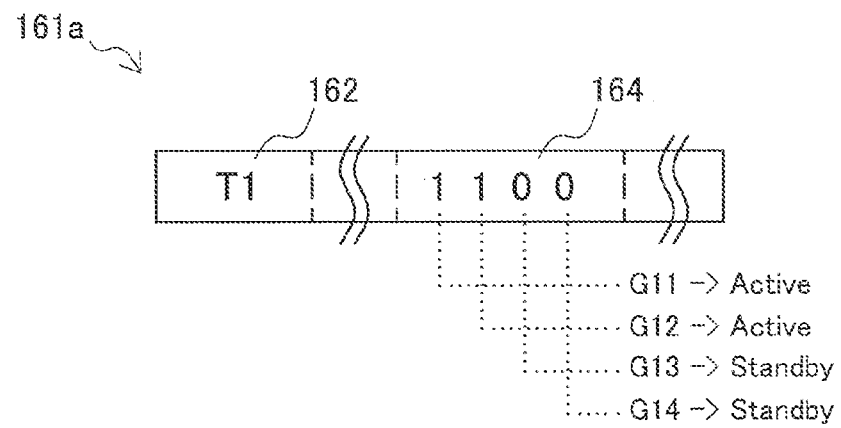
FIG. 11A is an explanatory diagram illustrating one example of a control message corresponding to the first configuration example of the small cell groups.

FIG. 11A is an explanatory diagram illustrating one example of a control message corresponding to the first configuration example of the small cell groups. Referring to FIG. 11A, the control message 161a includes a message type field 162 and an operation mode field 164. The message type field 162 indicates a code "T1" which means that the control message 161a is a message for specifying the operation modes in units of the small cell groups. The operation mode field 164 includes four flags respectively having a length of one bit here. The first bit of the operation mode field 164 is a flag meaning whether the small cell group G11 should be activated. When the first flag is "1", the small cell group G11 is activated, while, when the flag is "0", the small cell group G11 is deactivated. The second bit of the operation mode field 164 is a flag meaning whether the small cell group G12 should be activated. When the second flag is "1", the small cell group G12 is activated, while, when the flag is "0", the small cell group G12 is deactivated. The third bit of the operation mode field 164 is a flag meaning whether the small cell group G13 should be activated. When the third flag is "1", the small cell group G13 is activated, while, when the flag is "0", the small cell group G13 is deactivated. The fourth bit of the operation mode field 164 is a flag meaning whether the small cell group G14 should be activated. When the fourth flag is "1", the small cell group G14 is activated, while, when the flag is "0", the small cell group G14 is deactivated. In the example of FIG. 11A, because the bit sequence of the operation mode field 164 is "1100", the operation modes of the small cells belonging to the small cell groups G11 and G12 can be set to be the active mode, and the operation modes of the small cells belonging to the small cell groups G13 and G14 can be set to be the standby mode.

According to such a format of the control message, it is possible to dynamically control the operation modes of a number of small cell base stations 20 operating within the macro cell 12 explained using FIG. 6 only by signaling the bit sequence of only four bits (for example, broadcasting the bit sequence within the management area).

(2) Second Example

Figure 11B:
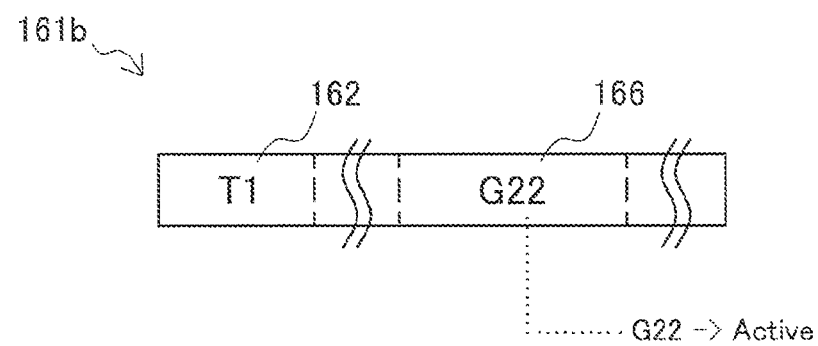
FIG. 11B is an explanatory diagram illustrating one example of a control message corresponding to the second configuration example of the small cell groups.

FIG. 11B is an explanatory diagram illustrating one example of a control message corresponding to the second configuration example of the small cell groups. Referring to FIG. 11B, the control message 161b includes a message type field 162 and an active group field 166. The active field group 166 indicates identification information of the small cell group for which it is determined that the active mode should be set. In the example of FIG. 11B, the active group field 166 includes only a group ID of the small cell group G22. Therefore, the operation modes of the small cells belonging to the small cell group G22 can be set to be the active mode, and the operation modes of the small cells not belonging to the small cell group G22 can be set to be the standby mode.

According to such a format of the control message, it is possible to dynamically control the operation modes of a number of small cell base stations 20 operating within the macro cell 12 explained using FIG. 8 only by signaling identification information of one (or a small number of) small cell group (for example, broadcasting the identification information within the management area).

The control messages illustrated in FIG. 11A and FIG. 11B may be defined as messages which are newly introduced. Alternatively, these control messages may be defined by, for example, using an existing message such as a multicast message for discontinuous transmission (DTX)/discontinuous reception (DRX) control.

2-4. Data Configuration (1) Small Cell Data

FIG. 12 is an explanatory diagram illustrating one example of a configuration of small cell data 13 which can be stored by the storage unit 130. Referring to FIG. 12, the small cell data 131 includes ten data items of a cell ID 132, a cell radius 133, a base station (BS) location 134, the maximum number of accommodated terminals 135, a BS type 136, an available channel 137, an operation channel 138, the number of accommodated terminals 139, a band use rate 140 and a group ID 141.

The cell ID 132 is an identifier for uniquely identifying each small cell (or a small cell base station). The cell radius 133 and the BS location 134 are information specifying coverage of each small cell. The cell radius 133 indicates a radius of the coverage of each small cell. The cell radius may be calculated from parameters such as maximum transmission power of each small cell base station, antenna gain and antenna height. The BS location 134 indicates a geographical location (latitude, longitude and altitude) of each small cell base station. The maximum number of accommodated terminals 135 indicates a maximum value of the number of terminals which can be accommodated by each small cell base station. The BS type 136 indicates whether each small cell base station is a fixed base station or a mobile base station (that is, a dynamic AP). The available channel 137 indicates a list of available channels which are allocated to each small cell or which are supported by each small cell base station. Each channel can be identified using, for example, a band number of international mobile telecommunication (IMT). The operation channel 138 indicates a list of channels actually used for operation of each small cell.

The number of accommodated terminals 139 indicates the number of terminals connected to each small cell at that time. The band use rate 140 indicates a proportion of actually measured traffic to the band of each small cell. The group ID 141 indicates an identifier (or a list of identifiers) for identifying a small cell group to which each small cell belongs.

Among these data items, the cell radius 133 and the BS location 134 can be registered when operation of each small cell is started, and can be updated every time the small cell base station moves or the configuration is changed. The maximum number of accommodated terminals 135 and the BS type 136 can be registered when the operation of each small cell is started. The available channel 137 can be allocated when the operation of each small cell is started and can be signaled to each small cell base station from the signaling unit 156. The operation channel 138 can be selected by each small cell base station among the signaled available channels and can be reported to the communication control apparatus 100. The number of accommodated terminals 139 and the band use rate 140 can be monitored by the mode determining unit 154 and can be updated as needed while each small cell operates in the active mode. The group ID 141 can be allocated to each small cell by the mode determining unit 154 when the operation of each small cell is started, and can be signaled to each small cell base station from the signaling unit 156. Allocation of the small cell groups to each small cell may be updated depending on change of a communication state within the management area.

The small cell data 131 illustrated in FIG. 12 includes only a record associated with one given small cell within the management area. However, the present disclosure is not limited to this example, and the small cell data 131 may include a record associated with a number of small cells existing over a plurality of management areas (for example, a plurality of sectors or a plurality of macro cells).

(2) Operation Mode Table

FIG. 13 is an explanatory diagram illustrating one example of a configuration of the operation mode table 145 which can be stored by the storage unit 130. The operation mode table 145 includes four data items of a pattern ID 146, a capacity range 147, a terminal number range 148 and an operation mode pattern 149.

The pattern ID 146 is an identifier for uniquely identifying each record of the operation mode table 145. The capacity range 147 indicates a range of system capacity of the management area, which is associated with each record. Here, the system capacity can be expressed with, for example, the number of bits which can be processed per unit time (that is, throughput). The terminal number range 148 indicates a range of the total number of terminals which are accommodated in the macro cell and the small cells in the management area, which is associated with each record. The operation mode pattern 149 indicates a setting pattern of the operation mode for each small cell group. The capacity range 147 and the terminal number range 148 can be updated when allocation of the small cell to each small cell group is changed.

In the example of FIG. 13, it is assumed that a (actually measured or predicted) traffic amount is used as the determination index relating to the system capacity requirements, and the latest traffic amount $C_{current}$ is smaller than $C_0$. In this case, the mode determining unit 154 refers to a record of the pattern ID="PT0" having the capacity range 147 conforming to the latest traffic amount $C_{current}$. Then, the mode determining unit 154 can determine that the operation modes of all the small cell groups G11, G12, G13 and G14 should be set to be the standby mode based on content of the operation mode pattern 149 of the record. When the latest traffic amount $C_{current}$ is greater than $C_0$ and smaller than $C_1$, the mode determining unit 154 refers to a record of the pattern ID="PT1" having the capacity range 147 conforming to the latest traffic amount $C_{current}$. Then, the mode determining unit 154 can activate only the small cell group G11 based on content of the operation mode pattern 149 of the record. When the latest traffic amount $C_{current}$ is greater than $C_1$ and smaller than $C_2$, the mode determining unit 154 refers to a record of the pattern ID="PT2" having the capacity range 147 conforming to the latest traffic amount $C_{current}$. Then, the mode determining unit 154 can activate the small cell groups G11 and G12 based on content of the operation mode pattern 149 of the record.

In the example of FIG. 13, it is assumed that the number of accommodated terminals is used as the determination index relating to the system capacity requirements, and the latest number of accommodated terminals $N_{current}$ is smaller than $N_0$. In this case, the mode determining unit 154 refers to a record of the pattern ID="PT0" having the capacity range 147 conforming to the latest number of accommodated terminals $N_{current}$. Then, the mode determining unit 154 can determine that the operation modes of all the small cell groups G11, G12, G13 and G14 should be set to be the standby mode based on content of the operation mode pattern 149 of the record. When the latest number of accommodated terminals $N_{current}$ is greater than No and smaller than $N_1$, the mode determining unit 154 refers to a record of the pattern ID="PT1" having the capacity range 147 conforming to the latest number of accommodated terminals $N_{current}$. Then, the mode determining unit 154 can activate only the small cell group G11 based on content of the operation mode pattern 149 of the record. When the latest number of accommodated terminals $N_{current}$ is greater than $N_1$ and smaller than $N_2$, the mode determining unit 154 refers to a record of the pattern ID="PT2" having the capacity range 147 conforming to the latest number of accommodated terminals $N_{current}$. Then, the mode determining unit 154 can activate the small cell groups G11 and G12 based on content of the operation mode pattern 149 of the record.

It should be noted that when capacity or the number of accommodated terminals expected for each small cell group is dynamically calculated, the storage unit 130 does not have to store the operation mode table 145 as illustrated in FIG. 13. Further, one of the capacity range 147 and the terminal number range 148 may be omitted.

(3) Calculation of Capacity

The system capacity in the management area corresponds to a sum of the capacity of the macro cell (or a sector of the macro cell) in the management area and the capacity of zero or one or more small cells operating in the active mode in the management area. As one example, the capacity of each cell can be calculated as follows. It should be noted that it is assumed here that each cell is operated according to the LTE scheme.

First, the number of resource blocks in a frequency direction of the l-th frequency channel used by the x-th small cell $SC_{k, x}$ belonging to the k-th small cell group within the management area is set at $N_{RB}(k, x, l)$. $N_{RB}(k, x, l)$ can be derived from a bandwidth of the frequency channel, and, for example, the number of resource blocks in the frequency direction of an IMT band having a bandwidth of 20 MHz is 100. Further, when the number of coding bits per one resource block is set at $N_{CB\_RB}$, the number of coding bits $M_{CB}(k, x, l)$ per one second which can be processed on the l-th frequency channel of the small cell $SC_{k, x}$ can be expressed with the following equation.

[Math 1]

$$M_{CB}(k,x,l) = N_{RB}(k,x,l) \cdot N_{CB\_RB} \qquad (1)$$

where $N_{CB\_RB} = F(Mod, N_{Symbol}, N_{Ref}, N_{Ctrl}, N_{Sync})$

It should be noted that in the above equation, Mod indicates a modulation order. $N_{symbol}$ which indicates the number of modulation symbols per one resource block, is equal to a product of the number of symbols (six or seven) in a time direction and the number of subcarriers (twelve). $N_{Ref}$, $N_{Ctrl}$ and $N_{Sync}$ respectively indicate the number of reference signals, the number of control signals and the number of synchronization signals per one resource block. A function F typically derives a number obtained by removing a bit for control from all the bits calculated from the number of modulation symbols per one resource block and the modulation order. The number of data bits $M_{DB}(k, x, l)$ per one second which can be processed on the l-th frequency channel of the small cell $SC_{k, x}$ can be expressed with the following equation by counting a coding rage $R_{code}$ in the equation.

[Math 2]

$$M_{DB}(k, x, l) = 8 \cdot \text{round}\left(0.125 \cdot M_{CB}(k, x, l) \cdot \frac{R_{Code}}{1024}\right) - M_{Tail} \qquad (2)$$

In equation (2), $M_{Tail}$ indicates the number of tail bits added upon coding. The number of data bits $M_{DB}(k, x)$ per one second which can be processed by the small cell $SC_{k, x}$ can be expressed with, for example, the following equation.

[Math 3]

$$M_{DB}(k, x) = \sum_{l} (M_{DB}(k, x, l) \cdot 1000 \cdot \alpha \cdot \beta) \qquad (3)$$

In equation (3), a parameter $\alpha$ indicates an adjustment margin, and a parameter $\beta$ indicates the number of MIMO streams. $M_{DB}(k, x)$ can correspond to capacity which is expected for each small cell. The system capacity (throughput) in the management area can be calculated using the following equation by counting the above-described capacity.

[Math 4]

$$C_{DB} = M_{DB\_Macro} + \sum_{k} \sum_{x} M_{DB}(k, x) \qquad (4)$$

In equation (4), $M_{DB\_Macro}$ is expected capacity of the macro cell (or the sector).

2-5. Processing Flow (1) Control Sequence

FIG. 14 is a sequence diagram illustrating one example of flow of communication control processing according to one embodiment. The sequence illustrated in FIG. 14 is involved by the communication control apparatus 100 which corresponds to the macro cell base station 10, the small cell base stations 20a and 20b, the terminal apparatuses 30a and 30b and the core network node 50.

At the beginning of the sequence, the small cell base station 20a operates in the standby mode, and the small cell base station 20b operates in the active mode. The terminal apparatus 30a is connected to the macro cell base station 10, and the terminal apparatus 30b is connected to the small cell base station 20b. For example, the core network node 50 transmits downlink traffic addressed to the terminal apparatus 30a to the macro cell base station 10 (step S10). The macro cell base station 10 transfers the downlink traffic to the terminal apparatus 30a (step S12). Further, for example, the terminal apparatus 30b transmits uplink traffic to the small cell base station 20b (step S14). The small cell base station 20b transfers the uplink traffic to the macro cell base station 10 (step S16), and the macro cell base station 10 further transfers the uplink traffic to the core network node 50 (step S18).

The mode determining unit 154 of the communication control apparatus 100 continuously monitors a connection state and a communication state of the terminals (step S20). The mode determining unit 154 then executes operation mode determination processing using the determination index relating to the system capacity requirements (step S30). Through the operation mode determination processing here, the operation modes in units of the small cell groups are determined. It should be noted that some examples of the detailed flow of the operation mode determination processing will be described later.

When the operation modes in units of the small cell groups are determined, the signaling unit 156 signals a control message for specifying the determined operation modes to the small cell base stations 20a and 20b on the back haul link (step S40). Further, the signaling unit 156 may report the determination result of the operation modes to the core network node 50 such as the MME (step S45).

Here, it is assumed as one example that the control message indicates that the small cell group to which the small cell base station 20a belongs should be activated (and the active mode of the small cell group to which the small cell base station 20b belongs should be maintained). The small cell base station 20a activates the small cells operated by the small cell base station 20a according to the control message received from the communication control apparatus 100 (step S50).

When the small cells operated by the small cell base station 20a are activated, the terminal apparatus 30a located in the vicinity of the small cell base station 20a can receive a reference signal transmitted from the small cell base station 20a (step S55). The terminal apparatus 30a executes measurement according to, for example, an instruction from the macro cell base station 10 which is a serving base station or according to a periodic timing and measures quality of the reference signal for serving cells and adjacent cells (step S60). The adjacent cells described here include small cells operated by the small cell base station 20a. It should be noted that when the terminal apparatus 30a is put into the standby state, cell search can be executed instead of measurement.

Subsequently, the terminal apparatus 30a transmits a measurement report including a list of quality indices as a result of the measurement to the macro cell base station 10 (step S65). It is assumed here that the transmitted measurement report indicates that the small cells operated by the small cell base station 20*a* exhibit the best quality. In this case, handover procedure which uses the macro cell base station 10 as a source base station and uses the small cell base station 20*a* as a target base station is executed, triggered by the measurement report (step S70). The terminal apparatus 30*a* tries to connect to the activated small cells of the small cell base station 20*a* by, for example, transmitting a random access signal (step S80).

(2) Operation Mode Determination Processing

First Example

Figure 15A:
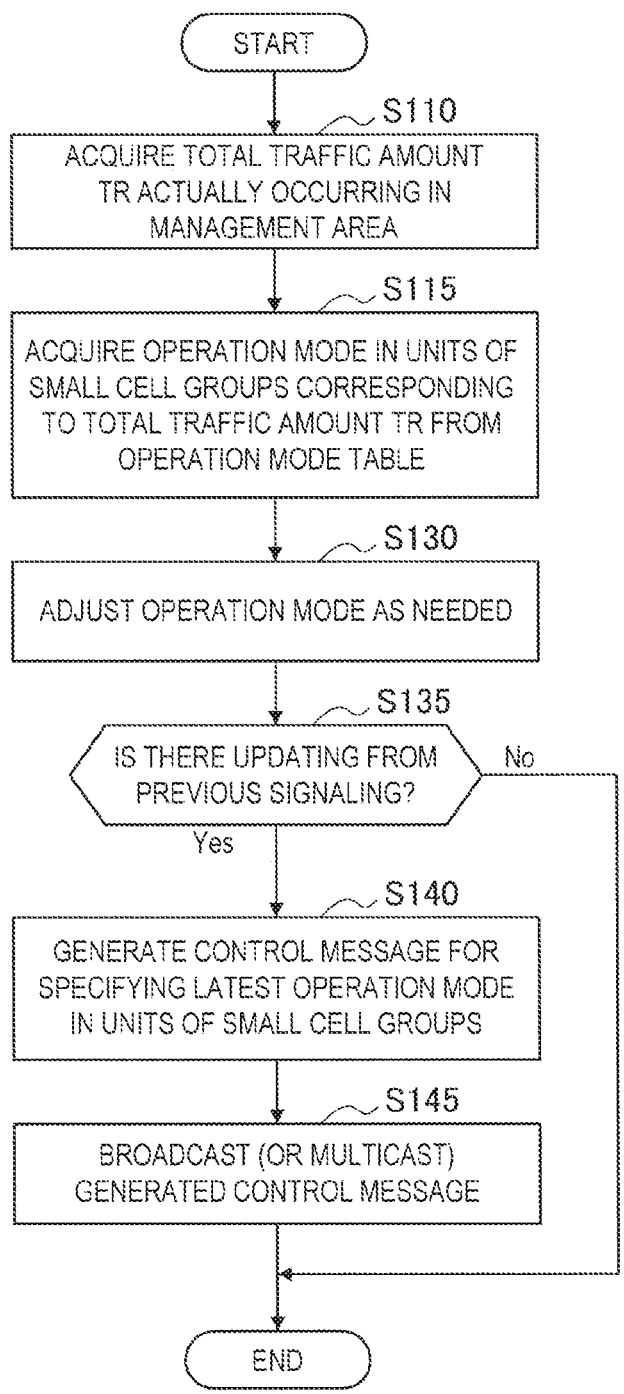
FIG. 15A is a flowchart illustrating a first example of flow of operation mode determination processing illustrated in FIG. 14.

FIG. 15A is a flowchart illustrating a first example of flow of the operation mode determination processing illustrated in FIG. 14. In the first example, the mode determining unit 154 uses an actual traffic amount actually occurring in the management area as the determination index and refers to the operation mode table 145 stored by the storage unit 130.

Referring to FIG. 15A, first, the mode determining unit 154 acquires a total traffic amount TR actually occurring within a given time window in the management area (step S110). The mode determining unit 154 then acquires the corresponding operation modes in units of the small cell groups by referring to the operation mode pattern of the record having the capacity range to which the total traffic amount TR belongs (step S115). It should be noted that when a plurality of operation mode tables 145 with different operation mode patterns are prepared, the mode determining unit 154 may switch the operation mode table to be referred to according to, for example, temporal conditions (the same also applies to other examples of the operation mode determination processing).

The mode determining unit 154 then adjusts the operation modes depending on statuses (such as, for example, normally operated/failed and a residual battery amount being small) of the individual small cell base stations (step S130). For example, when it is predicted that some small cell base stations cannot operate and the system capacity becomes insufficient, one or more small cell groups may be additionally activated. When the residual battery amount of a battery-driven small cell base station falls below a threshold, the small cell base station may be excluded from the small cell group (or from calculation of capacity) until the residual battery amount exceeds the threshold through charging. It should be noted that the adjustment of the operation modes here may be omitted.

Subsequently, the signaling unit 156 determines whether the operation modes determined or adjusted by the mode determining unit 154 include updating from the operation modes at the time of the previous signaling (step S135). Here, when the operation mode of none of the small cell groups is updated, the following processing is skipped. When the operation modes are updated, the signaling unit 156 generates a control message for specifying the latest operation modes in units of the small cell groups (step S140). The signaling unit 156 then broadcasts (or multicasts) the generated control message to one or more small cell base stations 20 within the management area (step S145).

(3) Operation Mode Determination Processing

Second Example

Figure 15B:
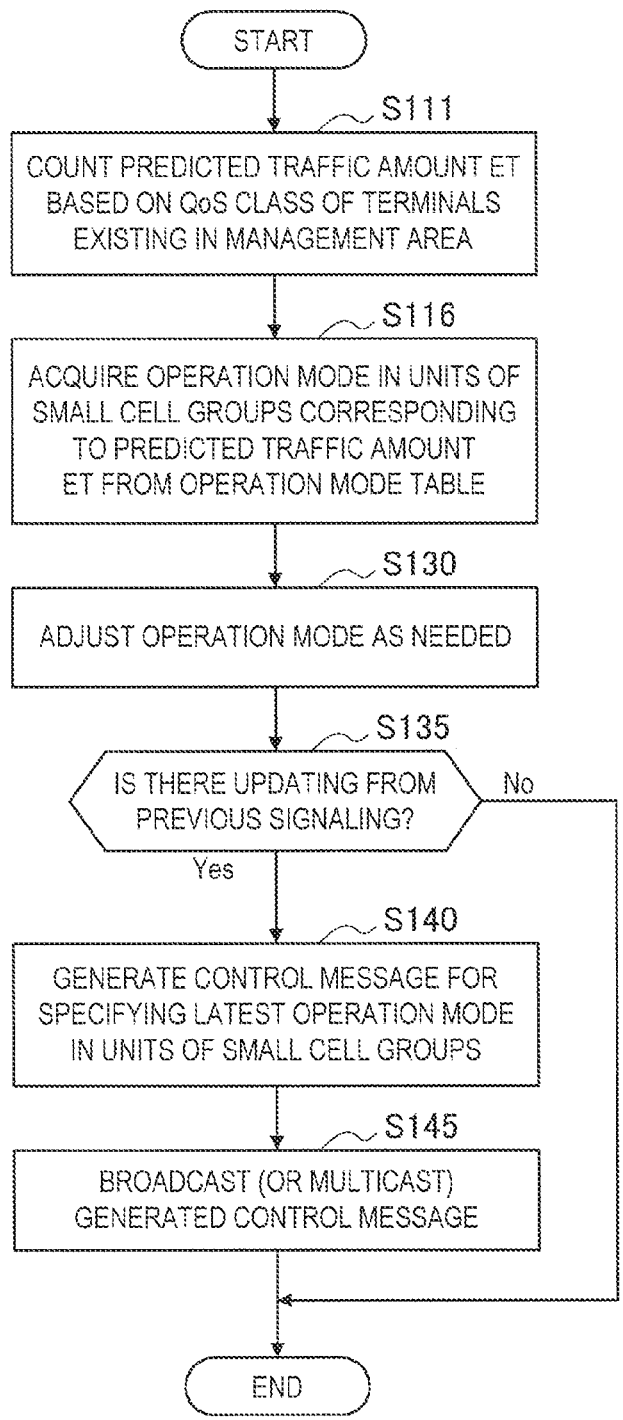
FIG. 15B is a flowchart illustrating a second example of flow of operation mode determination processing illustrated in FIG. 14.

FIG. 15B is a flowchart illustrating a second example of the flow of the operation mode determination processing illustrated in FIG. 14. In the second example, the mode determining unit 154 uses a predicted traffic amount which is predicted to occur in the management area as the determination index, and refers to the operation mode table 145 stored by the storage unit 130.

Referring to FIG. 15B, first, the mode determining unit 154 counts a predicted traffic amount ET based on QoS classes of the terminals existing in the management area (step S111). As one example, the QoS class includes the following four types of classes.

"Conversational" class: voice call, VoIP, video conference, or the like

"Streaming" class: real-time video delivery, or the like

"Interactive" class: web access, database search, or the like

"Background" class: e-mail, SMS, or the like

These four types of QoS classes have respectively different capacity requirements, and different attributes are defined for each QoS class (or traffic class). The attributes described here include, for example, a maximum bit rate, a delivery order, a bit error rate, a guaranteed bit rate, transfer delay, traffic processing priority, or the like. Therefore, the mode determining unit 154 can count the predicted traffic amount ET using these attribute information for each of the QoS classes of the terminals. For example, it is also possible to calculate a sum of the guaranteed bit rates of terminals belonging to the "Conversational" class or the "Streaming" class which has high priority as the predicted traffic amount ET. Alternatively, it is also possible to calculate a sum of maximum bit rates of terminals of all the classes as the predicted traffic amount ET.

Subsequently, the mode determining unit 154 acquires the corresponding operation modes in units of the small cell groups by referring to the operation mode pattern of the record having the capacity range to which the predicted traffic amount ET belongs in the operation mode table 145 (step S116).

Subsequently, the mode determining unit 154 adjusts the operation modes depending on statuses of the individual small cell base stations (step S130). It should be noted that the adjustment of the operation modes here may be omitted.

Subsequently, the signaling unit 156 determines whether the operation modes determined or adjusted by the mode determining unit 154 include updating from the operation modes at the time of the previous signaling (step S135). When the operation modes are updated, the signaling unit 156 generates a control message for specifying the latest operation modes in units of the small cell groups (step S140). The signaling unit 156 then broadcasts (or multicasts) the generated control message to one or more small cell base stations 20 within the management area (step S145).

(4) Operation Mode Determination Processing

Third Example

Figure 15C:
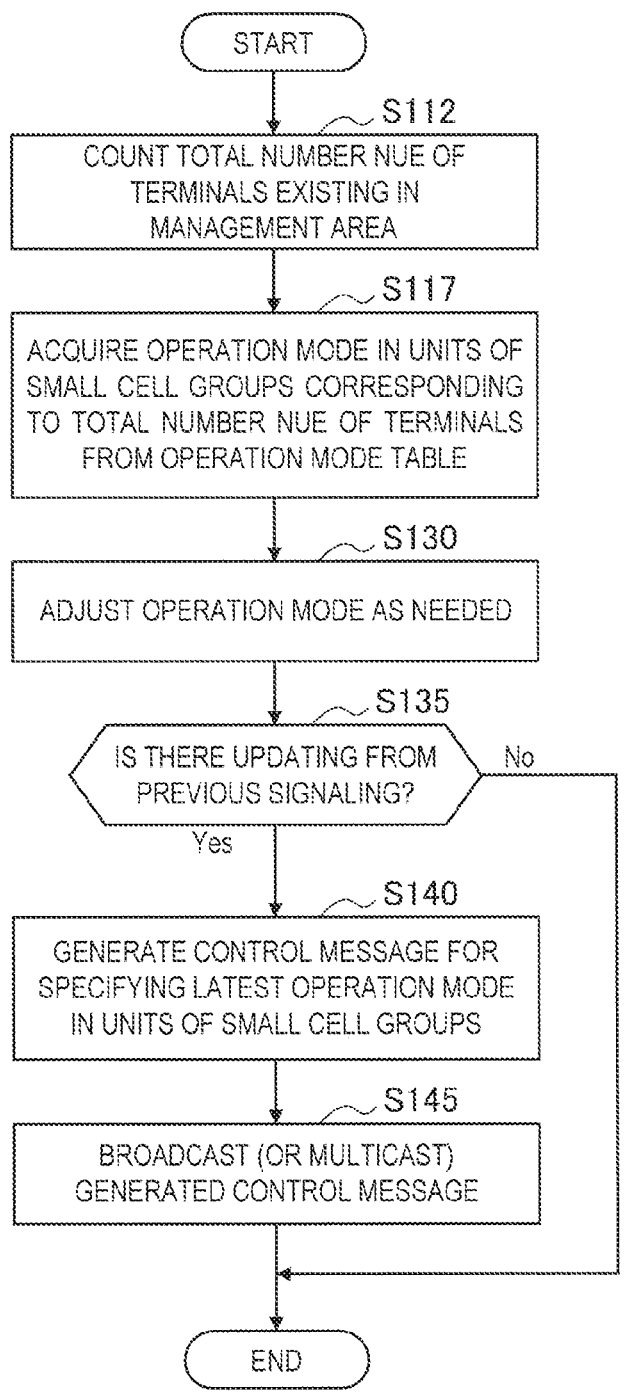
FIG. 15C is a flowchart illustrating a third example of flow of operation mode determination processing illustrated in FIG. 14.

FIG. 15C is a flowchart illustrating a third example of the flow of the operation mode determination processing illustrated in FIG. 14. In the third example, the mode determining unit 154 uses the number of terminals existing in the management area as the determination index and refers to the operation mode table 145 stored by the storage unit 130.

Referring to FIG. 15C, first, the mode determining unit 154 counts the total number $N_{UE}$ of the terminals existing in the management area (step S112). Subsequently, the mode determining unit 154 acquires the corresponding operation modes in units of the small cell groups by referring to the operation mode pattern of the record having the terminal number range to which the total number $N_{UE}$ of the terminals belong in the operation mode table 145 (step S117).

Subsequently, the mode determining unit 154 adjusts the operation modes depending on statuses of the individual small cell base stations (step S130). It should be noted that the adjustment of the operation modes here may be omitted.

Subsequently, the signaling unit 156 determines whether the operation modes determined or adjusted by the mode determining unit 154 include updating from the operation mode at the time of the previous signaling (step S135). When the operation modes are updated, the signaling unit 156 generates a control message for specifying the latest operation modes in units of the small cell groups (step S140). The signaling unit 156 then broadcasts (or multicasts) the generated control message to one or more small cell base stations 20 within the management area (step S145).

(5) Operation Mode Determination Processing

Fourth Example

Figure 15D:
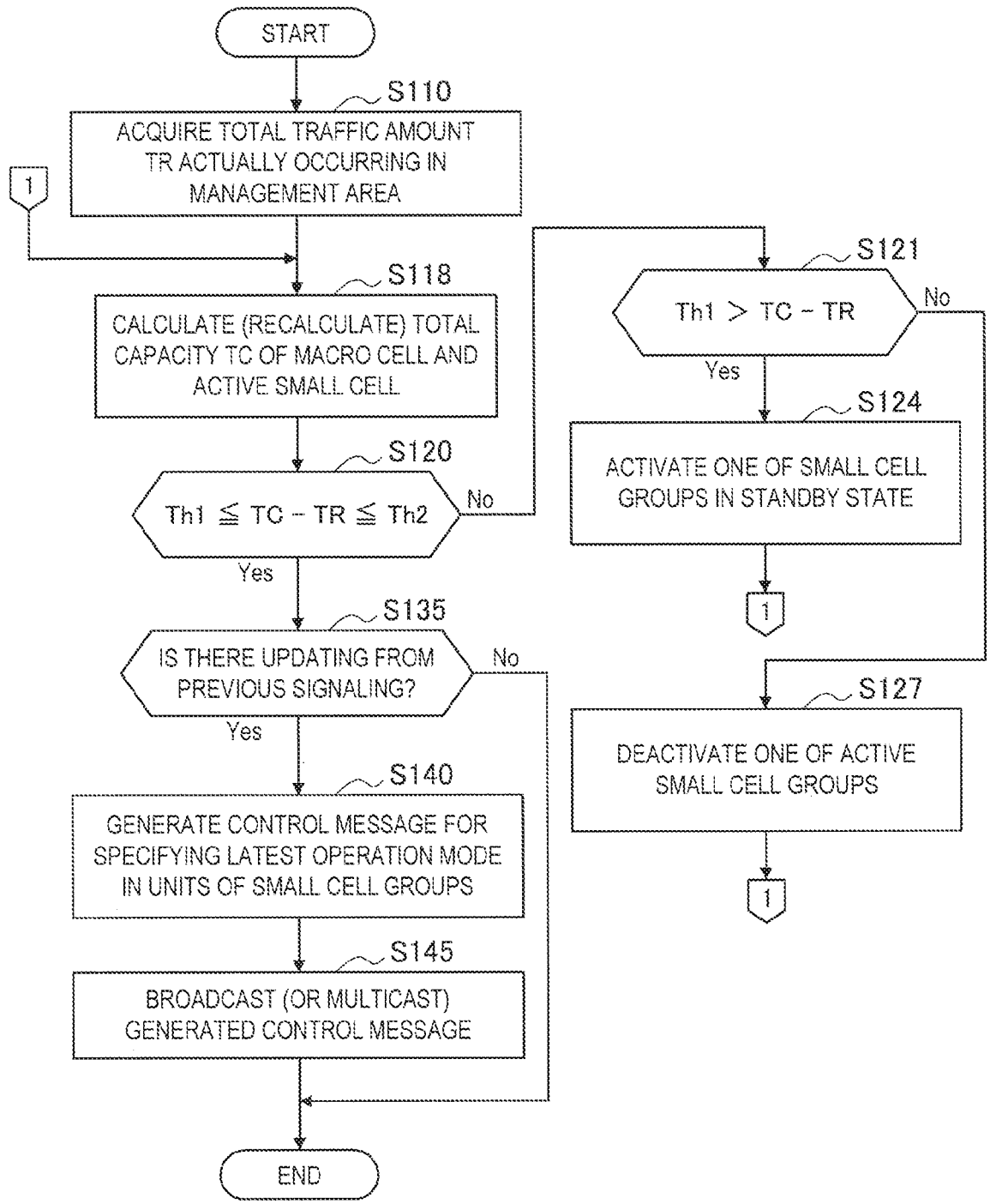
FIG. 15D is a flowchart illustrating a fourth example of flow of operation mode determination processing illustrated in FIG. 14.

FIG. 15D is a flowchart illustrating a fourth example of the flow of the operation mode determination processing illustrated in FIG. 14. In the fourth example, the mode determining unit 154 uses an actual traffic amount actually occurring in the management area as the determination index. The operation mode table 145 is not referred to.

Referring to FIG. 15D, first, the mode determining unit 154 acquires a total traffic amount TR actually occurring within a given time window in the management area (step S110). Subsequently, the mode determining unit 154 calculates system capacity of the management area, that is, total capacity TC which is equal to a sum of the capacity of the macro cell (or the sector) and the capacity of active small cells (step S118).

Subsequently, the mode determining unit 154 compares the total traffic amount TR with the total capacity TC (step S120, S121). Here, when a difference obtained by subtracting the total traffic amount TR from the total capacity TC (hereinafter, referred to as a capacity gap) falls below a threshold Th1, because the capacity is actually insufficient or there is a risk that the capacity may be insufficient, the mode determining unit 154 activates one of the small cell groups which are put into the standby state (step S124). Further, when the capacity gap exceeds a threshold Th2 (the threshold Th2 is a positive value and greater than the threshold Th1), because there is sufficient capacity, the mode determining unit 154 deactivates one of the active small cell groups (step S127). Such adjustment of the operation modes and recalculation of the system capacity TC are repeated until the capacity gap falls within a range specified with the threshold Th1 and the threshold Th2.

It should be noted that excess or shortage of the capacity may be adjusted at least partially by reducing or increasing transmission power of the small cell base stations which operate in the active mode at that time.

When the capacity gap falls within the range specified with the threshold Th1 and the threshold Th2, the signaling unit 156 determines whether the determined operation modes include updating from the operation modes at the time of the previous signaling (step S135). When the operation modes are updated, the signaling unit 156 generates a control message for specifying the latest operation modes in units of the small cell groups (step S140). The signaling unit 156 then broadcasts (or multicasts) the generated control message to one or more small cell base stations 20 in the management area (step S145).

(6) Operation Mode Determination Processing

Fifth Example

Figure 15E:
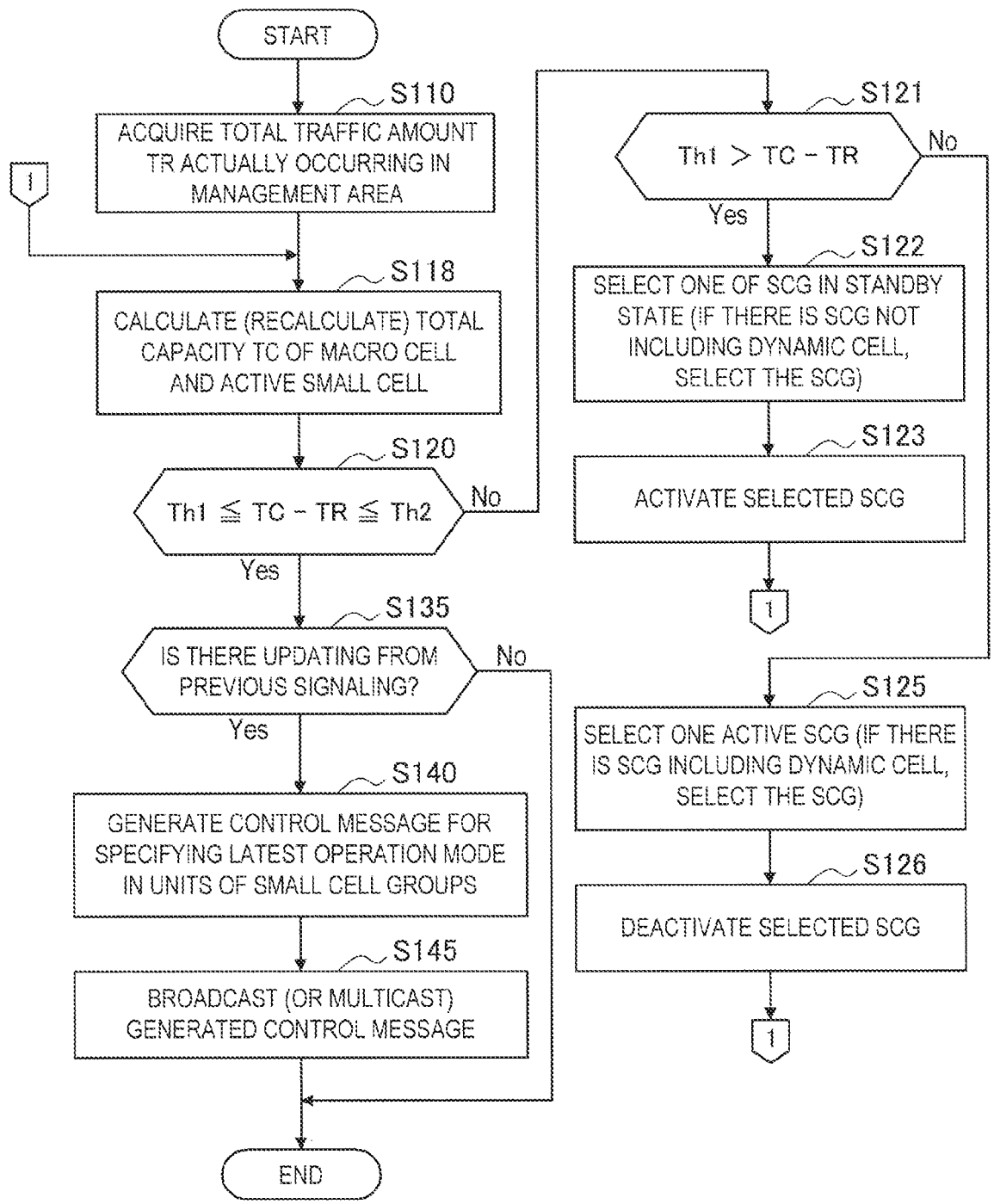
FIG. 15E is a flowchart illustrating a fifth example of flow of operation mode determination processing illustrated in FIG. 14.

FIG. 15E is a flowchart illustrating a fifth example of the flow of the operation mode determination processing illustrated in FIG. 14. In the fifth example, the mode determining unit 154 uses an actual traffic amount actually occurring in the management area as the determination index. The operation mode table 145 is not referred to. The operation modes of the small cell groups to which a dynamic cell does not belong are preferentially set to be the active mode over the small cell groups to which a dynamic cell belongs.

Referring to FIG. 15E, first, the mode determining unit 154 acquires a total traffic amount TR actually occurring within a given time window in the management area (step S110). Subsequently, the mode determining unit 154 calculates system capacity of the management area, that is, total capacity TC which is equal to a sum of the capacity of the macro cell (or the sector) and the capacity of active small cells (step S118).

Subsequently, the mode determining unit 154 compares the total traffic amount TR with the total capacity TC (step S120, S121). Here, when a capacity gap which is a difference obtained by subtracting the total traffic amount TR from the total capacity TC falls below the threshold Th1, the mode determining unit 154 selects one of the small cell groups which are put into the standby state (step S122). Here, when there is a small cell group which does not include a dynamic cell, the mode determining unit 154 preferentially selects the small cell group. The mode determining unit 154 then activates the selected small cell group (step S123). Further, when the capacity gap exceeds the threshold Th2, the mode determining unit 154 selects one of the active small cell groups (step S125). Here, when there is a small cell group which includes a dynamic cell, the mode determining unit 154 preferentially selects the small cell group. The mode determining unit 154 then deactivates the selected small cell group (step S126). Such adjustment of the operation modes and recalculation of the system capacity TC are repeated until the system gap falls within the range specified with the threshold Th1 and the threshold Th2.

When the capacity gap falls within the range specified with the threshold Th1 and the threshold Th2, the signaling unit 156 determines whether the determined operation modes include updating from the operation modes at the time of the previous signaling (step S135). When the operation modes are updated, the signaling unit 156 generates a control message for specifying the latest operation modes in units of the small cell groups (step S140). The signaling unit 156 then broadcasts (or multicasts) the generated control message to one or more small cell base stations 20 within the management area (step S145).

By preferentially utilizing the fixed small cell base station instead of the dynamic AP as in the fifth example, it is possible to, for example, minimize change of the configuration due to movement of the base station or battery shortage, so that it is possible to secure stable operation of the system.

It should be noted that any combination of the examples of the operation mode determination processing explained using FIG. 15A to FIG. 15E is possible.

3. CONFIGURATION EXAMPLE OF RADIO COMMUNICATION APPARATUS

3-1. Configuration of Each Unit

Figure 16:
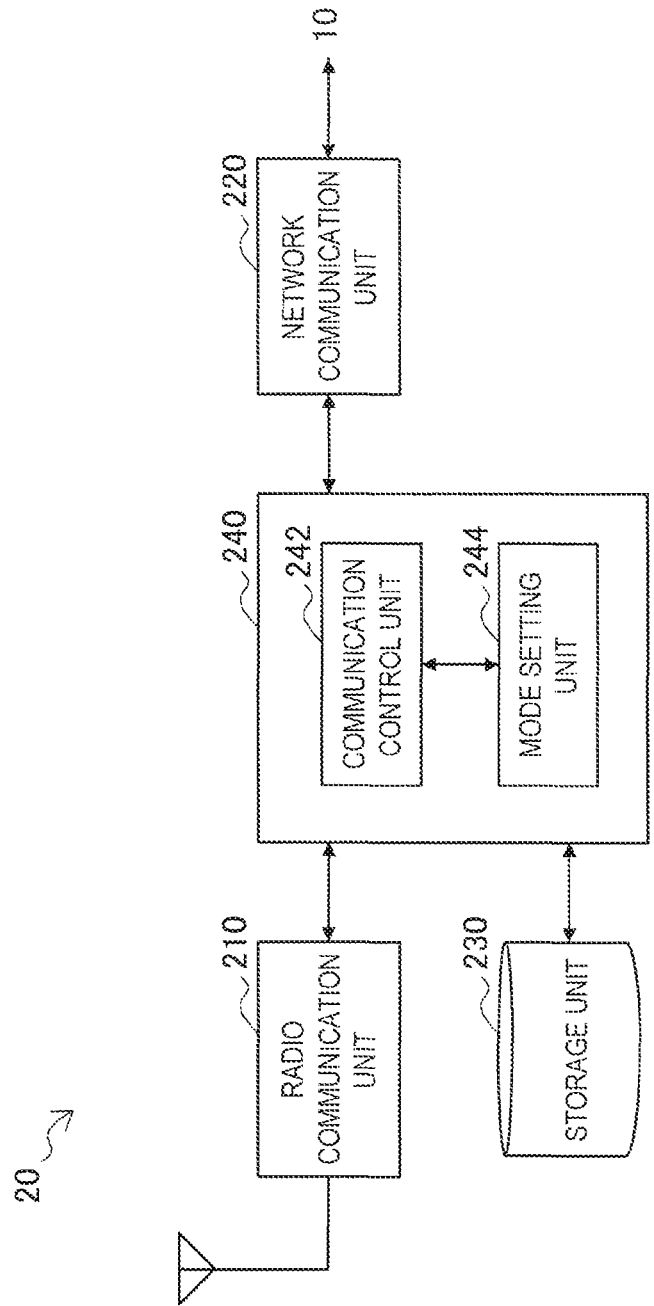
FIG. 16 is a block diagram illustrating one example of a configuration of a radio communication apparatus according to one embodiment.

FIG. 16 is a block diagram illustrating one example of a configuration of the small cell base station 20 according to the present embodiment. Referring to FIG. 16, the small cell base station 20 includes a radio communication unit 210, a network communication unit 220, a storage unit 230 and a control unit 240.

(1) Radio Communication Unit

The radio communication unit 210 provides second radio communication service to the terminal apparatuses 30 located within the small cells 22 disposed within the macro cell 12. The small cells 22 belong to at least one of a plurality of small cell groups. For example, the radio communication unit 210 transmits a reference signal on downlink in the active mode. The reference signal is searched by the terminal apparatuses 30 during procedure of cell selection or cell reselection. Further, the terminal apparatuses 30 derive communication quality for each cell which becomes a basis of handover determination by executing measurement for the reference signal.

(2) Network Communication Unit

The network communication unit 220 establishes a back haul link with the macro cell base station 10, and mediates communication between the small cell base stations 20 and the macro cell base station 10. It should be noted that the back haul link may be part of the radio link established by the radio communication unit 210. In this case, the network communication unit 220 can be omitted from the configuration of the small cell base station 20.

(3) Storage Unit

The storage unit 230 stores a program and data for operation of the small cell base station 20 using a storage medium such as a hard disc and a semiconductor memory.

(4) Control Unit

The control unit 240 controls general operation of the small cell base station 20 using a processor such as a CPU and a DSP. In the present embodiment, the control unit 240 includes a communication control unit 242 and a mode setting unit 244.

The communication control unit 242 controls provision of the second radio communication service. For example, the communication control unit 242 makes the network communication unit 220 transfer uplink data traffic received by the radio communication unit 210 to the macro cell base station 10 depending on its address. Further, the communication control unit 242 makes the radio communication unit 210 transmit downlink data traffic received from other nodes by the network communication unit 220 to the terminal apparatus 30 to which the downlink data traffic is addressed.

The mode setting unit 244 sets the operation modes of the radio communication unit 210 and the communication control unit 242 to be one of the operation mode candidates including the above-described active mode and the standby mode. When the back haul link is established, the mode setting unit 244, for example, registers information relating to coverage of the own apparatus and information such as the maximum number of accommodated terminals and the base station type in the communication control apparatus 100. Further, the mode setting unit 244 receives an allocation message indicating allocation of available channels and group IDs from the communication control apparatus 100. The mode setting unit 244 identifies the small cell groups which are allocated to the own apparatus by referring to the allocation message. Further, the mode setting unit 244 receives a control message for specifying the operation modes in units of the small cell groups signaled from the communication control apparatus 100. The control message specifies the operation modes determined by the communication control apparatus 100 for the small cell groups to which the small cells operated by each small cell base station belong. The mode setting unit 244 then sets the operation modes of the radio communication unit 210 and the communication control unit 242 according to the received control message.

For example, concerning the control message 161a illustrated in FIG. 11A, when the own group is a small cell group G11, the mode setting unit 244 sets the operation modes of the radio communication unit 210 and the communication control unit 242 to be the active mode if the first bit of the operation mode field 164 is "1". On the other hand, the mode setting unit 244 sets the operation modes of the radio communication unit 210 and the communication control unit 242 to be the standby mode if the first bit of the operation mode field 164 is "0".

Further, for example, concerning the control message 161b illustrated in FIG. 11B, when the own group is a small cell group G21, the mode setting unit 244 sets the operation modes of the radio communication unit 210 and the communication control unit 242 to be the active mode if the active group field 166 includes group ID "G21". On the other hand, the mode setting unit 244 sets the operation modes of the radio communication unit 210 and the communication control unit 242 to be the standby mode if the active group field 166 does not include the group ID "G21".

The mode setting unit 244 continuously monitors signaling from the communication control apparatus 100. The mode setting unit 244 confirms the operation modes specified by the received message every time the above-described broadcasted or multicasted control message is received. When the specified operation modes of the groups are different from the currently set operation modes, the mode setting unit 244 changes setting of the operation modes.

In one modified example, the small cell base station 20 may independently determine allocation of the small cell groups to the small cells operated by the radio communication unit 210 without requiring signaling from the communication control apparatus 100, that is, without receiving the above-described allocation message. The allocation of the small cell groups can be, for example, determined from geographical location of the small cell base station 20 based on mapping of the segments and the small cell groups as illustrated in FIG. 6 or FIG. 8. For example, it is assumed that the small cell base station 20 is a mobile terminal which can temporarily operate the dynamic cell, that is, a dynamic AP. Mobility of the dynamic AP can cause frequency change of allocation of the small cell groups to the dynamic AP. However, when the dynamic AP independently determines allocation of the small cell groups, because it is not necessary to signal the allocation message, it is possible to avoid increase of a signaling overhead due to frequency change of allocation of the small cell groups. The mapping of the geographical segments and the small cell groups may be broadcasted by the communication control apparatus 100 or may be downloaded by the small cell base station 20 from some data server.

3-2. Processing Flow

Figure 17A:
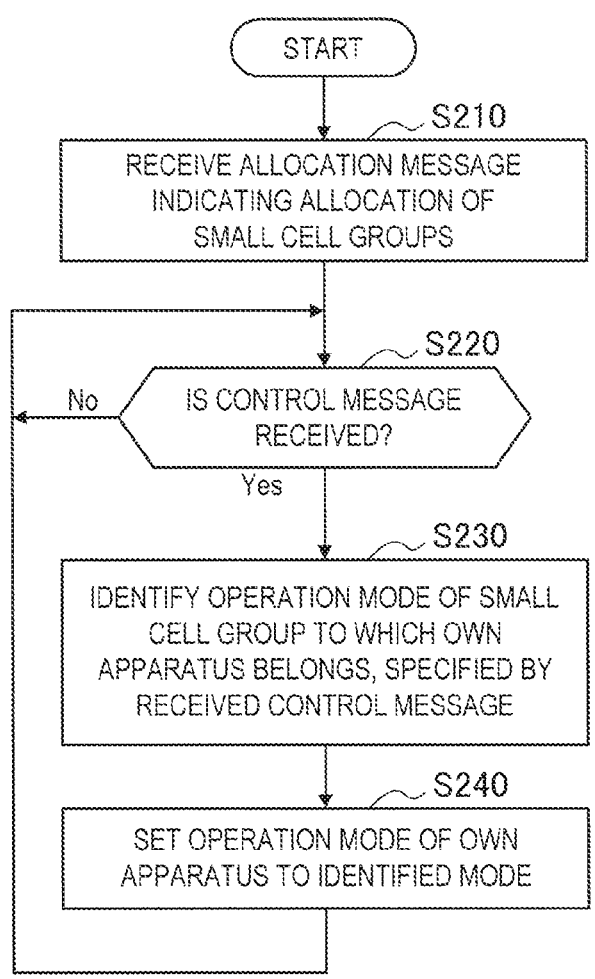
FIG. 17A is a flowchart illustrating a first example of flow of operation mode setting processing.

FIG. 17A is a flowchart illustrating a first example of flow of operation mode setting processing which can be executed by the small cell base station 20.

Referring to FIG. 17A, first, the mode setting unit 244 receives an allocation message indicating allocation of the small cell groups (step S210). Subsequently, the mode setting unit 244 waits for reception of the control message for specifying the operation modes in units of the small cell groups from the communication control apparatus 100 (step S220). When the control message is received, the mode setting unit 244 identifies the operation modes of the small cell groups to which the own apparatus belongs, specified by the control message (step S230). The mode setting unit 244 then sets the operation modes of the radio communication unit 210 and the communication control unit 242 to be the identified mode (step S240).

Figure 17B:
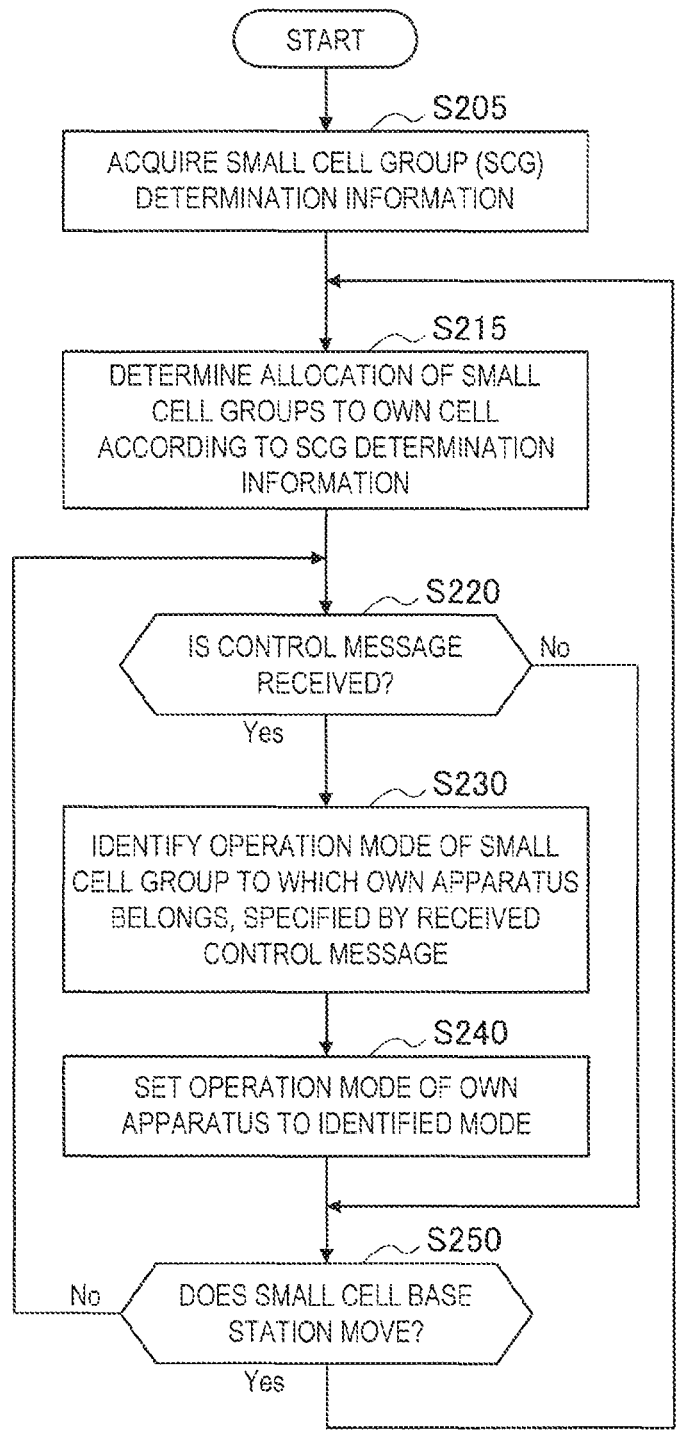
FIG. 17B is a flowchart illustrating a second example of the flow of the operation mode setting processing.

FIG. 17B is a flowchart illustrating a second example of the flow of the operation mode setting processing which can be executed by the small cell base station 20. In the second example, the small cell base station 20 is a dynamic AP.

Referring to FIG. 17B, first, the mode setting unit 244 acquires small cell group determination information for determining allocation of the small cell groups (step S210). The small cell group determination information maps, for example, the geographical segments within the management area and the corresponding small cell groups. Subsequently, the mode setting unit 244 determines allocation of the small cell groups to the dynamic cells operated by the small cell base station 20 (step S215). Subsequently, the mode setting unit 244 waits for reception of the control message for specifying the operation modes in units of the small cell groups from the communication control apparatus 100 (step S220). When the control message is received, the mode setting unit 244 identifies the operation modes of the small cell groups to which the small cell base station 20 belongs, specified by the control message (step S230). The mode setting unit 244 then sets the operation modes of the radio communication unit 210 and the communication control unit 242 to be the identified mode (step S240). Further, the mode setting unit 244 determines whether the small cell base station 20 moves (step S250). When the small cell base station 20 does not move, the operation mode setting processing returns to step S220 in which reception of the control message is waited. When the small cell base station 20 moves, allocation of the small cell groups to the dynamic cells operated by the small cell base station 20 is determined again according to SCG determination information.

4. APPLICATION TO SPECTRUM ACCESS SYSTEM (SAS)

Figure 18:
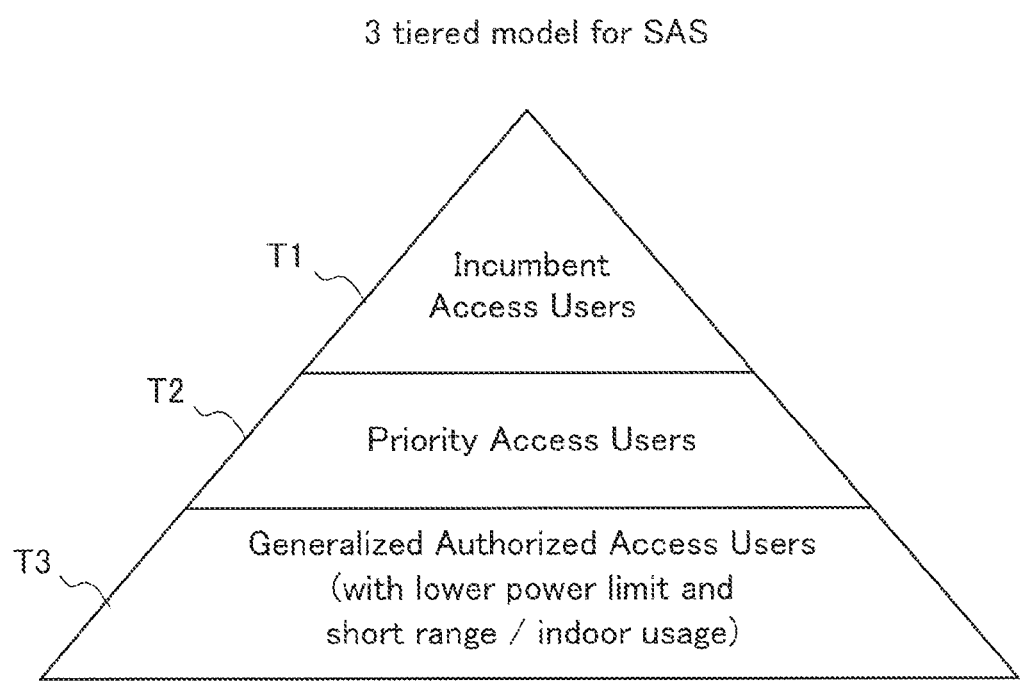
FIG. 18 is an explanatory diagram for explaining a hierarchical role model in a spectrum access system (SAS).

In discussion regarding frequency usage by the Federal Communications Commission (FCC), a 3 tiered model in which players performing spectrum access are classified into three categories as illustrated in FIG. 18 is proposed. A player of a top tier T1 is a primary user (incumbent access user) who is legally authorized. A player of intermediate tier T2 is a priority user (priority access user) to whom usage is approved secondarily but preferentially. A player of a bottom tier T3 is a general user (generalized authorized access user) to whom requirements for approval are not strict although usage is limited to usage at close range or usage at low transmission power, or indoor usage. In an SAS of such a 3 tiered model, the above-described communication control apparatus 100 may be introduced by a player of any tiers (or the third party). For example, by coordinately controlling the operation modes of the small cells operated by the priority user (and the general user) in units of the small cell groups, it is possible to maintain optimal capacity of the SAS and optimal power consumption of the whole system with a small signaling overhead.

5. APPLICATION EXAMPLE

The technique according to the present disclosure can be applied to various products. For example, a management server which controls the operation modes of the small cells as an upper node of the macro cell base station 10 can be realized in a form of a tower server, a rack server, a blade server, or the like. Further, in a control module (for example, an integrated circuit module configured with one die or a car or a blade to be inserted into a slot of the blade server) mounted on the management server, an operation mode control function for the small cells may be realized.

For example, the macro cell base station 10 and the small cell base station 20 may be realized as any type of evolved Node B (eNB). A small eNB may be an eNB that covers a cell smaller than a macro cell, such as a pico eNB, micro eNB, or home (femto) eNB. Instead, the macro cell base station 10 and the small cell base station 20 may be realized as any other types of base stations such as a NodeB and a base transceiver station (BTS). The macro cell base station 10 may include a main body (that is also referred to as a base station apparatus) configured to control radio communication, and one or more remote radio heads (RRH) disposed in a different place from the main body. Additionally, various types of terminals to be discussed later may also operate as the small cell base station 20 by temporarily or semi-permanently executing a base station function.

For example, a terminal apparatus 30 may be realized as a mobile terminal such as a smartphone, a tablet personal computer (PC), a notebook PC, a portable game terminal, a portable/dongle type mobile router, and a digital camera, or an in-vehicle terminal such as a car navigation apparatus. The terminal apparatus 30 may also be realized as a terminal (that is also referred to as a MTC terminal) that performs M2M communication. Furthermore, a radio communication module (such as an integrated circuit module including a single die) mounted on the terminal apparatus 30 may be provided.

5-1. Application Example Regarding Management Server

Figure 19:
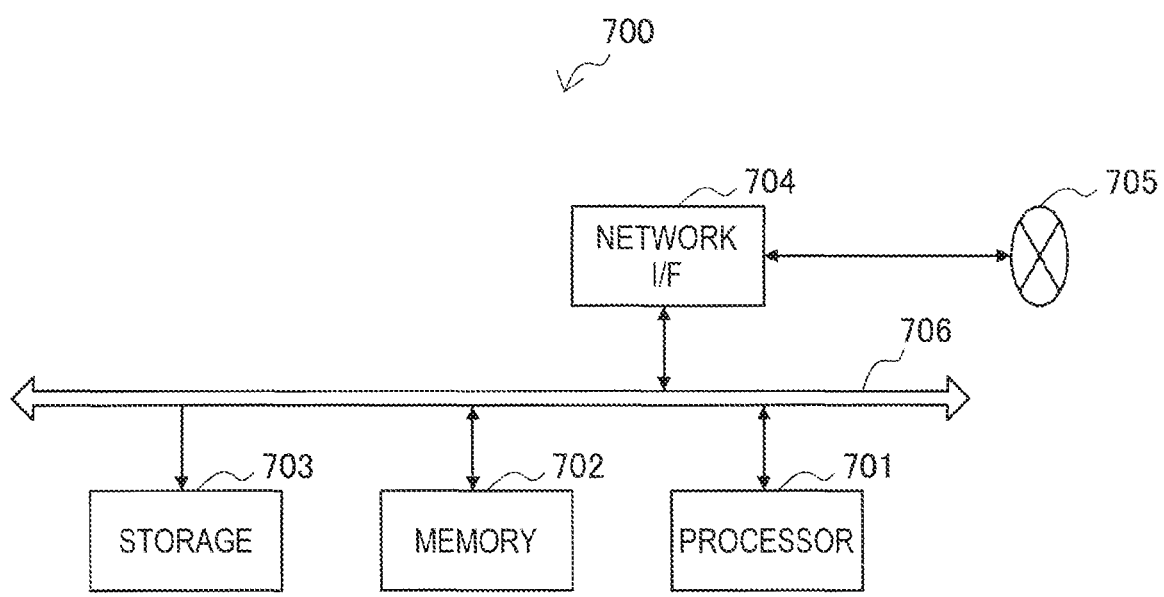
FIG. 19 is a block diagram illustrating one example of a schematic configuration of a management server.

FIG. 19 is a block diagram illustrating an example of a schematic configuration of a management server 700 to which the technology of the present disclosure may be applied. The management server 700 includes a processor 701, a memory 702, a storage 703, a network interface 704, and a bus 706.

The processor 701 may be, for example, a central processing unit (CPU) or a digital signal processor (DSP), and controls functions of the server 700. The memory 702 includes random access memory (RAM) and read only memory (ROM), and stores a program that is executed by the processor 701 and data. The storage 703 may include a storage medium such as a semiconductor memory and a hard disk.

The network interface 704 is a wired communication interface for connecting the server 700 to a wired communication network 705. The wired communication network 705 may be a core network such as an Evolved Packet Core (EPC), or a packet data network (PDN) such as the Internet.

The bus 706 connects the processor 701, the memory 702, the storage 703, and the network interface 704 to each other. The bus 706 may include two or more buses (such as a high speed bus and a low speed bus) each of which has different speed.

By the management server 700 illustrated in FIG. 19 playing a role of controlling the operation modes in units of the small cell groups, even if a number of small cells are deployed within the system, it is possible to integrally and coordinately execute control of the operation modes of the small cells while suppressing increase of the signaling overhead.

5-2. Application Examples Regarding Base Station

First Application Example

Figure 20:
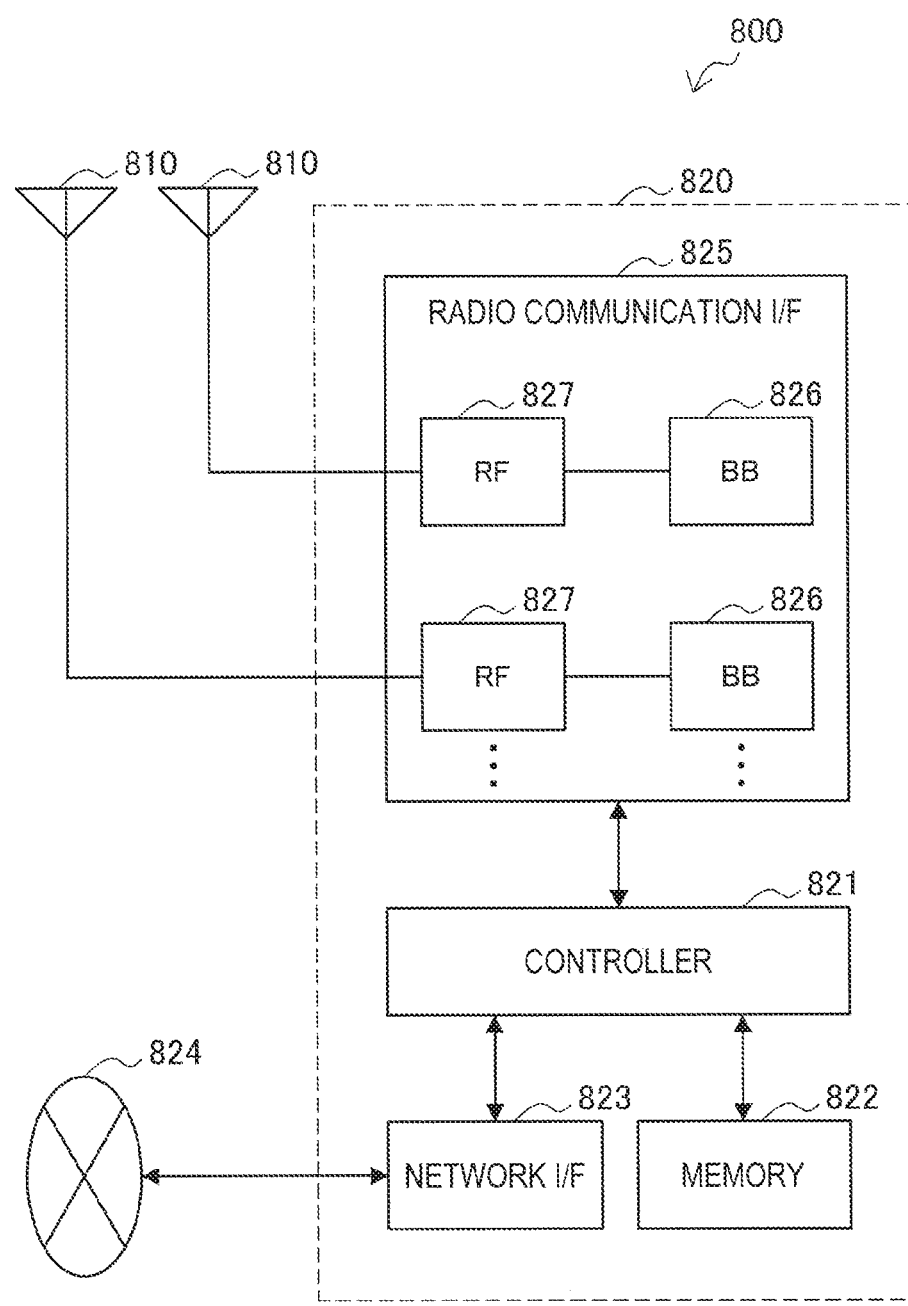
FIG. 20 is a block diagram illustrating a first example of a schematic configuration of an eNB.

FIG. 20 is a block diagram illustrating a first example of a schematic configuration of an eNB to which the technology of the present disclosure may be applied. An eNB 800 includes one or more antennas 810 and a base station apparatus 820. Each antenna 810 and the base station apparatus 820 may be connected to each other via an RF cable.

Each of the antennas 810 includes a single or multiple antenna elements (such as multiple antenna elements included in an MIMO antenna), and is used for the base station apparatus 820 to transmit and receive radio signals. The eNB 800 may include the multiple antennas 810, as illustrated in FIG. 20. For example, the multiple antennas 810 may be compatible with multiple frequency bands used by the eNB 800. Although FIG. 20 illustrates the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station apparatus 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as Long Term Evolution (LTE) and LTE-Advanced, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 20. For example, the multiple BB processors 826 may be compatible with multiple frequency bands used by the eNB 800. The radio communication interface 825 may include the multiple RF circuits 827, as illustrated in FIG. 20. For example, the multiple RF circuits 827 may be compatible with multiple antenna elements. Although FIG. 20 illustrates the example in which the radio communication interface 825 includes the multiple BB processors 826 and the multiple RF circuits 827, the radio communication interface 825 may also include a single BB processor 826 or a single RF circuit 827.

Second Application Example

Figure 21:
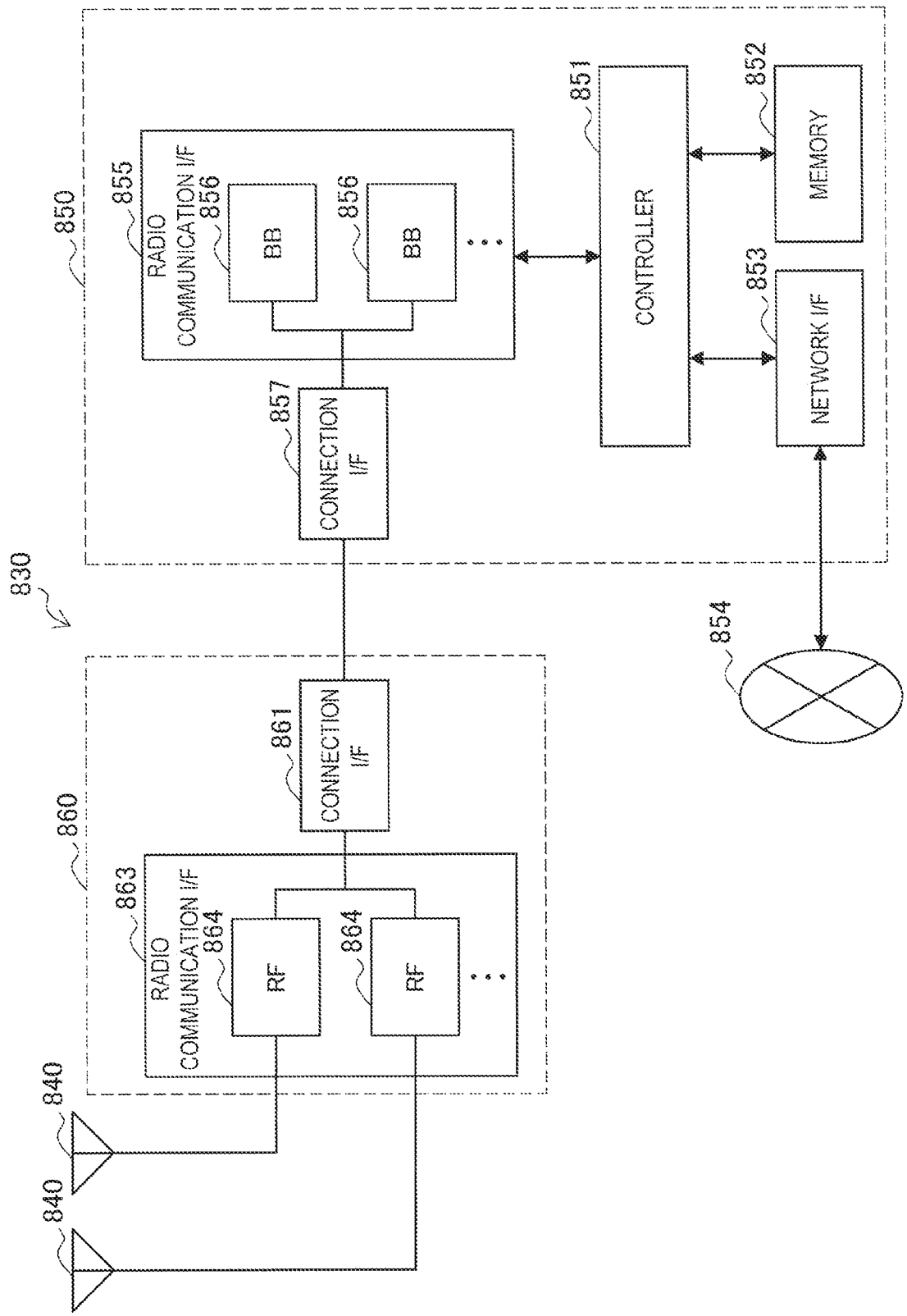
FIG. 21 is a block diagram illustrating a second example of a schematic configuration of an eNB.

FIG. 21 is a block diagram illustrating a second example of a schematic configuration of an eNB to which the technology of the present disclosure may be applied. An eNB 830 includes one or more antennas 840, a base station apparatus 850, and an RRH 860. Each antenna 840 and the RRH 860 may be connected to each other via an RF cable. The base station apparatus 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 21. For example, the multiple antennas 840 may be compatible with multiple frequency bands used by the eNB 830. Although FIG. 21 illustrates the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 20.

The radio communication interface 855 supports any cellular communication scheme such as LTE and LTE-Advanced, and provides radio communication to a terminal positioned in a sector corresponding to the RRH 860 via the RRH 860 and the antenna 840. The radio communication interface 855 may typically include, for example, a BB processor 856. The BB processor 856 is the same as the BB processor 826 described with reference to FIG. 20, except the BB processor 856 is connected to the RF circuit 864 of the RRH 860 via the connection interface 857. The radio communication interface 855 may include the multiple BB processors 856, as illustrated in FIG. 21. For example, the multiple BB processors 856 may be compatible with multiple frequency bands used by the eNB 830. Although FIG. 21 illustrates the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives radio signals via the antenna 840. The radio communication interface 863 may typically include, for example, the RF circuit 864. The RF circuit 864 may include, for example, a mixer, a filter, and an amplifier, and transmits and receives radio signals via the antenna 840. The radio communication interface 863 may include multiple RF circuits 864, as illustrated in FIG. 21. For example, the multiple RF circuits 864 may support multiple antenna elements. Although FIG. 21 illustrates the example in which the radio communication interface 863 includes the multiple RF circuits 864, the radio communication interface 863 may also include a single RF circuit 864.

The eNB 800 illustrated in FIG. 20 may be utilized as the small cell base station 20 explained in the present specification. For example, the communication control unit 242 and the mode setting unit 244 of the small cell base station 20 may be implemented at the radio communication interface 825. Further, at least part of these functions may be implemented at the controller 821.

Further, the eNB 800 and eNB 830 illustrated in FIG. 20 and FIG. 21 may be utilized as the macro cell base station 10 explained in the present specification. For example, the communication control unit 152, the mode setting unit 154 and the signaling unit 156 of the macro cell base station 10 may be implemented at the radio communication interface 825, the radio communication interface 855 and/or the radio communication interface 863. Further, at least part of these functions may be implemented at the controller 821 and the controller 851.

5-3. Application Examples Regarding Terminal Apparatus

First Application Example

Figure 22:
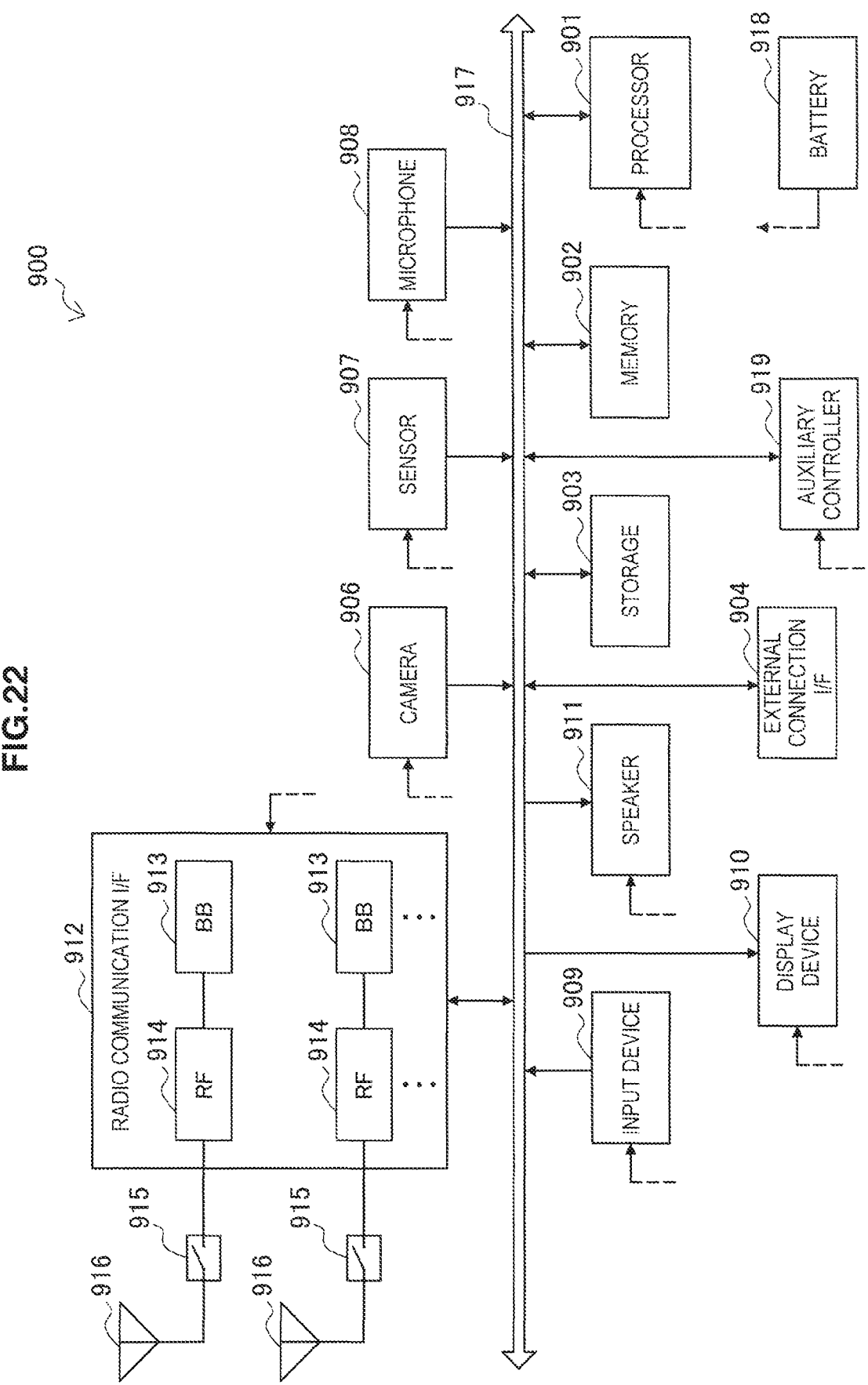
FIG. 22 is a block diagram illustrating an example of a schematic configuration of a smartphone.

FIG. 22 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LTE and LTE-Advanced, and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 912 may also be a one chip module that has the BB processor 913 and the RF circuit 914 integrated thereon. The radio communication interface 912 may include the multiple BB processors 913 and the multiple RF circuits 914, as illustrated in FIG. 22. Although FIG. 22 illustrates the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of radio communication scheme such as a short-distance wireless communication scheme, a near field communication scheme, and a radio local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements included in an MIMO antenna), and is used for the radio communication interface 912 to transmit and receive radio signals. The smartphone 900 may include the multiple antennas 916, as illustrated in FIG. 22. Although FIG. 22 illustrates the example in which the smartphone 900 includes the multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 22 via feeder lines, which are partially shown as dashed lines in the figure. The auxiliary controller 919 operates a minimum necessary function of the smartphone 900, for example, in a sleep mode.

When the smartphone 900 illustrated in FIG. 22 operates as the small cell base station 20, the communication control unit 242 and the mode setting unit 244 of the small cell base station 20 may be implemented at the radio communication interface 912. Further, at least part of these functions may be implemented at the processor 901 or the auxiliary controller 919. Further, the smartphone 900 may be utilized as the terminal apparatus 30.

Second Application Example

Figure 23:
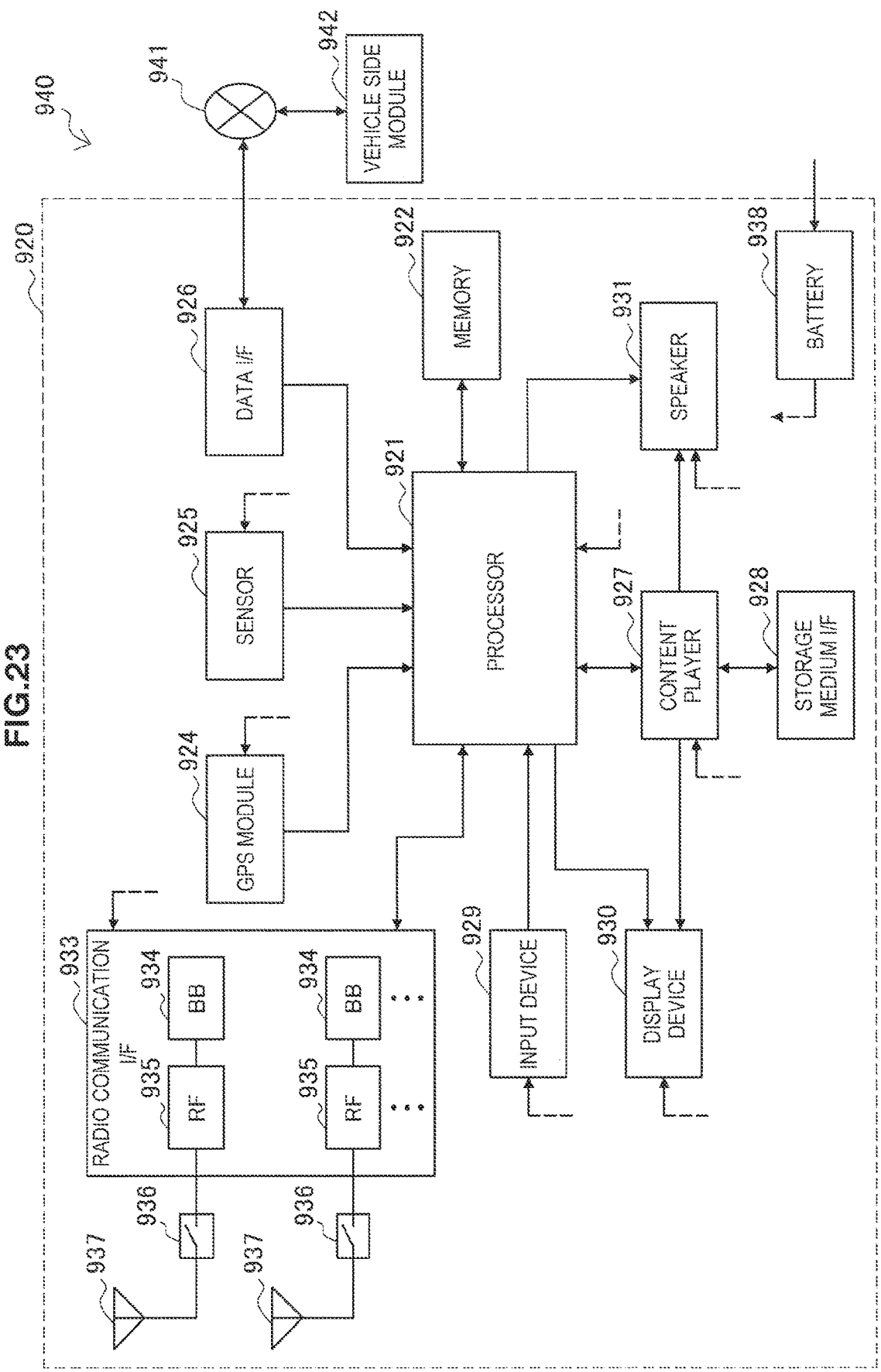
FIG. 23 is a block diagram illustrating an example of a schematic configuration of a car navigation apparatus.

FIG. 23 is a block diagram illustrating an example of a schematic configuration of a car navigation apparatus 920 to which the technology of the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and another function of the car navigation apparatus 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation apparatus 920. The sensor 925 may include a group of sensors such as a gyro sensor, a geomagnetic sensor, and an air pressure sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The radio communication interface 933 supports any cellular communication scheme such as LET and LTE-Advanced, and performs radio communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may be a one chip module having the BB processor 934 and the RF circuit 935 integrated thereon. The radio communication interface 933 may include the multiple BB processors 934 and the multiple RF circuits 935, as illustrated in FIG. 23. Although FIG. 23 illustrates the example in which the radio communication interface 933 includes the multiple BB processors 934 and the multiple RF circuits 935, the radio communication interface 933 may also include a single BB processor 934 or a single RF circuit 935.

Furthermore, in addition to a cellular communication scheme, the radio communication interface 933 may support another type of radio communication scheme such as a short-distance wireless communication scheme, a near field communication scheme, and a radio LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements (such as multiple antenna elements included in an MIMO antenna), and is used for the radio communication interface 933 to transmit and receive radio signals. The car navigation apparatus 920 may include the multiple antennas 937, as illustrated in FIG. 23. Although FIG. 23 illustrates the example in which the car navigation apparatus 920 includes the multiple antennas 937, the car navigation apparatus 920 may also include a single antenna 937.

Furthermore, the car navigation apparatus 920 may include the antenna 937 for each radio communication scheme. In that case, the antenna switches 936 may be omitted from the configuration of the car navigation apparatus 920.

The battery 938 supplies power to blocks of the car navigation apparatus 920 illustrated in FIG. 23 via feeder lines that are partially shown as dashed lines in the figure. The battery 938 accumulates power supplied form the vehicle.

When the car navigation apparatus 920 illustrated in FIG. 23 operates as the small cell base station 20, the communication control unit 242 and the mode setting unit 244 of the small cell base station 20 may be implemented at the radio communication interface 933. Further, at least part of these functions may be implemented at the processor 921. Further, the car navigation apparatus 920 may be utilized as the terminal apparatus 30.

The technology of the present disclosure may also be realized as an in-vehicle system (or a vehicle) 940 including one or more blocks of the car navigation apparatus 920, the in-vehicle network 941, and a vehicle module 942. The vehicle module 942 generates vehicle data such as vehicle speed, engine speed, and trouble information, and outputs the generated data to the in-vehicle network 941.

6. CONCLUSION

The embodiment of the technique according to the present disclosure has been described in detail above using FIG. 1 to FIG. 23. According to the above-described embodiment, in a system in which a plurality of small cells are disposed, each small cell is allocated to at least one of a plurality of small cell groups, and, after the operation mode of each of the plurality of small cells is determined in units of the small cell groups, a control message for specifying the operation modes in units of the small cell groups is signaled to each small cell base station. Therefore, also in an environment where a number of small cell base stations are deployed, it is possible to avoid occurrence of a considerable signaling overhead for notification of the operation modes of the small cells. Further, a small signaling overhead for notification of the operation modes also means that it is allowed to increase frequency of notifying the small cell base stations of the operation modes from the control entities. Therefore, according to the technique according to the present disclosure, it is possible to make the ratio of active small cells appropriately follow a traffic state which temporally changes.

By the way, it is also possible to employ a method in which a small base station is activated on conditions that there is a terminal in the vicinity of the small cell base station. However, an existing positioning method such as a method based on a global positioning system (GPS) or a method based on direction-of-arrival estimation (DoA) does not have sufficient positioning accuracy compared to a cell size of the small cell. Further, while there is larger needs for installation of the small cell base station indoors than outdoors, the terminal existing indoors often cannot utilize GPS positioning. Therefore, it is difficult to say that the operation modes of the small cells based on positioning of the terminal are effectively controlled at the moment. On the other hand, with the technique according to the present disclosure, the operation modes of the small cells are controlled in units of the small cell groups according to the determination index relating to the system capacity requirements for each of a relatively broad management area which can correspond to the macro cell or the sector of the macro cell. Therefore, while control is geographically rough to some extent, it is possible to variedly change the ratio of active small cells so as to follow the traffic state. At that time, positioning of the terminals is not essential.

Note that the series of control processing by the respective apparatuses described herein may be implemented by using any of software, hardware, and a combination of software and hardware. Programs constituting the software are previously stored in, for example, a recording medium (a non-transitory medium) provided in the inside or the outside of the respective apparatuses. And the respective programs are, for example, read into a random access memory (RAM) during execution and executed by the processor such as the CPU.

Further, the processes described using the flowcharts in the present description may not necessarily be executed in the order indicated by the flowchart. Some process steps may be executed in parallel. Further, additional process steps may be employed, and some process steps may be omitted.

The preferred embodiment of the present disclosure has been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

A communication control apparatus including:

a communication unit configured to communicate with each of communication nodes operating a plurality of small cells, each of which belongs to at least one of a plurality of small cell groups;

a determining unit configured to determine whether operation modes of the plurality of small cells should be set to be an active mode in units of the small cell groups; and a signaling unit configured to signal a control message for specifying the operation modes in units of the small cell groups, determined by the determining unit to the communication nodes via the communication unit.

(2)

The communication control apparatus according to (1), wherein each of the plurality of small cell groups includes small cells disposed in a distributed manner over a management area corresponding to a macro cell or a sector of the macro cell.

(3)

The communication control apparatus according to (2), wherein the determining unit determines the operation modes in units of the small cell groups using a determination index relating to a system capacity requirement.

(4)

The communication control apparatus according to (3), wherein the determination index includes a traffic amount actually occurring in the management area.

(5)

The communication control apparatus according to (3), wherein the determination index includes a traffic amount predicted to occur in the management area.

(6)

The communication control apparatus according to (5), wherein the determining unit predicts the traffic amount based on a quality of service (QoS) class of a terminal existing in the management area.

(7)

The communication control apparatus according to (2), wherein the determination index includes the number of terminals existing in the management area.

(8)

The communication control apparatus according to any one of (3) to (7), wherein each small cell belongs to a single small cell group, and wherein the determining unit determines that the operation modes of more small cell groups should be set to be the active mode when the determination index indicates a larger system capacity requirement.

(9)

The communication control apparatus according to any one of (3) to (7), wherein the plurality of small cell groups include a different number of small cells, and wherein the determining unit determines that the operation mode of a small cell group including more small cells should be set to be the active mode when the determination index indicates a larger system capacity requirement.

(10)

The communication control apparatus according to any one of (3) to (9), wherein the determining unit determines the operation modes in units of the small cell groups using a table which maps a value of the determination index and the operation mode for each of the small cell groups.

(11)

The communication control apparatus according to any one of (3) to (10), wherein the determining unit switches the determination index to be used for determination of the operation modes according to a terminal handled within a system or a type of traffic.

(12)

The communication control apparatus according to (10), wherein the determining unit switches the table to be used for determination of the operation modes according to a temporal condition.

(13)

The communication control apparatus according to any one of (1) to (12), wherein the plurality of small cells include a dynamic cell dynamically operated by a mobile terminal, and wherein the determining unit determines that an operation mode of a first small cell group to which the dynamic cell does not belong should be preferentially set to be the active mode over a second small cell group to which the dynamic cell belongs.

(14)

The communication control apparatus according to any one of (1) to (13), wherein the signaling unit signals an allocation message indicating allocation of the small cell groups to communication nodes operating the small cells via the communication unit upon initial registration of each small cell.

(15)

The communication control apparatus according to any one of (1) to (14), wherein the plurality of small cells include a dynamic cell temporarily operated by a mobile terminal, and wherein the mobile terminal determines allocation of the small cell groups to the dynamic cell without requiring individual signaling from the communication control apparatus.

(16)

The communication control apparatus according to any one of (1) to (15), wherein the communication unit broadcasts or multicasts the control message to the plurality of communication nodes.

(17)

A communication control method including:

grouping a plurality of small cells in a manner that each small cell belongs to at least one of a plurality of small cell groups in a communication control apparatus which communicates with each of communication nodes operating the plurality of small cells;

determining whether operation modes of the plurality of small cells should be set to be an active mode in units of the small cell groups; and signaling a control message for specifying the determined operation modes in units of the small cell groups to the communication nodes.

(18)

A radio communication apparatus including:

a radio communication unit configured to operate a first small cell among a plurality of small cells, each of which belongs to at least one of a plurality of small cell groups; and a control unit configured to set an operation mode of the first small cell according to a control message for specifying an operation mode determined for the small cell group to which the first small cell belongs, the control message being signaled from a control node which determines whether operation modes of the plurality of small cells should be set to be an active mode in units of the small cell groups.

(19)

A radio communication method including:

in a radio communication apparatus which operates a first small cell among a plurality of small cells, each of which belongs to at least one of a plurality of small cell groups, receiving a control message for specifying an operation mode determined for a small cell group to which the first small cell belongs, the control message being signaled from a control node which determines whether operation modes of the plurality of small cells should be set to be an active mode in units of the small cell groups; and setting the operation mode of the first small cell according to the received control message.

(20)

A radio communication system including:
a communication control apparatus which includes
a plurality of communication nodes configured to operates a plurality of small cells, each of which belongs to at least one of a plurality of small cell groups,
a determining unit configured to determine whether operation modes of the plurality of small cells should be set to be an active mode in units of the small cell groups, and
a signaling unit configured to signal a control message for specifying the operation modes in units of the small cell groups, determined by the determining unit to the plurality of communication nodes.

REFERENCE SIGNS LIST 1 radio communication system
10 macro cell base station
12 macro cell
100 communication control apparatus
110 radio communication unit
120 network communication unit
130 storage unit
131 small cell data
145 operation mode table
150 control unit
152 communication control unit
154 mode determining unit 156 signaling unit
20 small cell base station
22 small cell
210 radio communication unit
220 network communication unit
230 storage unit
240 control unit
242 communication control unit
244 mode setting unit
30 terminal apparatus

The invention claimed is:

1. An apparatus comprising:
a processor configured to
communicate with a plurality of small cells within a management area of a macro cell, each of the plurality of small cells belongs to at least one of a plurality of small cell groups and is capable of communicating with a plurality of terminal apparatuses, wherein at each of the plurality of small cell groups comprises at least two of the plurality of small cells;
acquire a determination index for the management area, the determination index being indicative of a capacity within the management area;
wherein the determination index comprises a traffic amount predicted to occur in the management area, and
wherein the processor predicts the traffic amount based on a quality of service (QoS) class of a terminal existing in the management area;
determine an operating mode of each of the plurality of small cells groups based on the determination index by referencing a table, wherein the table associates a capacity range and a terminal number range with the operation mode of each of the plurality of small cells groups;
determine whether the determined operating modes comprise updating from a previous signaling;
generate a control message for updating the operating mode of each of the plurality of small cells groups when the determined operation modes comprise updating; and
send, using a transmitter, the control message for specifying the determined operating modes of each of the plurality of the small cell groups.

2. The apparatus according to claim 1, wherein each of the plurality of small cell groups comprises small cells disposed in a distributed manner over the management area corresponding to the macro cell or a sector of the macro cell.

3. The apparatus according to claim 2, wherein the processor determines the operation modes in units of the small cell groups using a system capacity requirement.

4. The apparatus according to claim 3, wherein the determination index comprises a traffic amount actually occurring in the management area.

5. The apparatus according to claim 3, wherein the determination index comprises the number of terminals existing in the management area.

6. The apparatus according to claim 3,
wherein each small cell belongs to a single small cell group, and
wherein the processor determines that the operation modes of more small cell groups should be set to be the active mode, when the determination index indicates a larger system capacity requirement.

7. The apparatus according to claim 3, wherein the plurality of small cell groups comprise a different number of small cells, and
wherein the processor determines that the operation mode of a small cell group comprising more small cells should be set to be the active mode when the determination index indicates a larger system capacity requirement.

8. The apparatus according to claim 3, wherein the processor switches the determination index. to be used for determination of the operation modes according to a terminal handled within a system or a type of traffic.

9. The apparatus according to claim 1,
wherein the plurality of small cells comprise a dynamic cell dynamically operated by a mobile terminal, and
wherein the processor determines that an operation mode of a first small cell group to which the dynamic cell does not belong should be preferentially set to be the active mode over a second small cell group to which the dynamic cell belongs.

10. The apparatus according to claim 1, wherein the processor signals an allocation message indicating allocation of the small cell groups to the small cells via the transmitter upon initial registration of each small cell.

11. The apparatus according to claim 1, wherein the plurality of small cells comprise a dynamic cell temporarily operated by a mobile terminal, and
wherein the mobile terminal determines allocation of the small cell groups to the dynamic cell without requiring individual signaling from the communication control apparatus.

12. The apparatus according to claim 1, wherein the transmitter broadcasts or multicasts the control message to a plurality of communication nodes that operate the plurality of small cells.

13. A communication control method comprising:
grouping a plurality of small cells within a management area of a macro cell in a manner that each small cell belongs to at least one of a plurality of small cell groups in a communication control apparatus which communicates with each of communication nodes operating the plurality of small cells, wherein each of the plurality of small cell groups comprises at least two of the plurality of small cells;
acquiring a determination index for the management area, the determination index being indicative of a capacity within the management area;
wherein the determination index comprises a traffic amount predicted to occur in the management area, and
wherein predicting the traffic amount based on a quality of service (QoS) class of a terminal existing in the management area;
determining an operating mode of each of the plurality of small cells groups based on the determination index by referencing a table, wherein the table associates a capacity range and a terminal number range with the operation mode of each of the plurality of small cells groups;
determine whether the determined operating modes comprise updating from a previous signaling;
generating a control message for updating the operating mode of each of the plurality of small cells groups when the determined operation modes comprise updating; and
sending, using a transmitter, the control message for specifying the determined operating modes of each of the plurality of the small cell groups to the communication nodes.

14. A radio communication system comprising:
a communication control apparatus which comprises
a plurality of communication nodes configured to operate a plurality of small cells, each of the plurality of small cells belongs to at least one of a plurality of small cell groups and is capable of communicating with a plurality of terminal apparatuses, wherein each of the plurality of small cell groups comprises at least two of the plurality of small cells,
a processor configured to
  communicate with each of the plurality of communication nodes within a management area of a macro cell,
  acquire a determination index for the management area, the determination index being indicative of a capacity or a terminal number within the management area;
  wherein the determination index comprises a traffic amount predicted to occur in the management area, and
  wherein the processor predicts the traffic amount based on a quality of service (QoS) class of a terminal existing in the management area;
  determine an operating mode of each of the plurality of small cells groups based on the determination index by referencing a table, wherein the table associates a capacity range and a terminal number range with the operation mode of each of the plurality of small cells groups,
determine whether the determined operating modes comprise updating from a previous signaling,
generate a control message for updating the operating mode of each of the plurality of small cells groups when the determined operation modes comprise updating, and
  send the control message for specifying the determined operating modes of each of the plurality of the small cell groups.

15. The apparatus of claim 1, wherein the processor is further configured to
  determine a number of terminals in the macro cell, the macro cell divided into equal parts in an azimuth angle; and
  match an operating mode of each of the group with the number of terminals in the macro cell using the table.

16. The apparatus of claim 1, wherein the control message comprises an operation field having a length corresponding to a number of the plurality of small cell groups, each bit of the operation field indicating the operating status of one of the plurality of small groups.

17. The apparatus of claim 1, wherein the macro cell comprises a plurality of sectors, and a particular sector of the plurality of sectors corresponds to the management area.

18. The apparatus of claim 17, wherein the plurality of sectors are divided into equal parts in an azimuth angle or divided in a three dimensional manner according to elevation.

19. The apparatus of claim 1, wherein the determination index comprises a number of terminal apparatuses within the management area.

20. The apparatus of claim 1, wherein the table is selected based on temporal conditions.

21. The apparatus of claim 1. wherein the operating mode is selected from a plurality of operating modes comprising an active mode and a standby mode, and each of the plurality of small cells is capable of communicating with the plurality of terminal apparatuses when in the active mode.

* * * * *